(12) United States Patent
Gilbertson et al.

(10) Patent No.: US 6,295,553 B1
(45) Date of Patent: Sep. 25, 2001

(54) METHOD AND APPARATUS FOR PRIORITIZING DELIVERY OF DATA TRANSFER REQUESTS

(75) Inventors: Roger Lee Gilbertson, Minneapolis; James L. DePenning, Eagan, both of MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/218,210

(22) Filed: Dec. 22, 1998

(51) Int. Cl.[7] .................................................. G06F 15/16
(52) U.S. Cl. ........................ 709/207; 710/40; 710/111; 710/244; 710/264
(58) Field of Search .............................. 709/207; 710/40, 710/36, 111, 240, 264, 107, 113, 241, 244, 110, 112, 116, 119, 128; 711/151, 150, 158

(56) References Cited
U.S. PATENT DOCUMENTS 6,104,751 * 8/2000 Artieri .
6,199,124 * 3/2001 Ramakrishnan et al. .............. 710/40

* cited by examiner

*Primary Examiner*—Ario Etienne
(74) *Attorney, Agent, or Firm*—Charles A. Johnson; Mark T. Starr; Nawrocki, Rooney & Sivertson, P.A.

(57) ABSTRACT

A system and method for prioritizing the delivery of information transfer requests using a least-recently-serviced rotational priority technique in a data processing system having one or more requesters to supply the information transfer requests. Active requesters have currently pending information transfer requests, and non-active requesters have no currently pending information transfer requests. Transfer authorization is granted to an information transfer request associated with an active requester that is currently assigned to the highest priority level in a range of priority levels. Each of the active and non-active requesters that have a priority level less than the priority level of the active requester that was granted the transfer have their priority levels incremented, while the non-active requesters having a priority level greater than the priority level of the active requester that was granted the transfer is maintained at its current priority level. The priority level of the active requester that was granted the transfer is then reassigned to the lowest priority level in the range of priority levels.

16 Claims, 16 Drawing Sheets

FIG. 1 SYMMETRICAL MULTIPROCESSING PLATFORM

SUB-PROCESSING MODULE (SUB-POD)

MEMORY CLUSTER (MCL)

DATA CROSSBAR (MDA)

POD DATA BLOCK

MSU DATA BLOCK

MEMORY CONTROLLER (MCA)

POD ADDRESS CONTROL BLOCK

METHOD AND APPARATUS FOR PRIORITIZING DELIVERY OF DATA TRANSFER REQUESTS

CROSS-REFERENCE TO OTHER PATENT APPLICATIONS

The following co-pending patent applications of common assignee contains some common disclosure:

"High-Performance Modular Memory System With Crossbar Connections" Ser. No. 09/001,592, filed Dec. 31, 1997, which is incorporated herein by reference in its entirety; and "Multi-Level Priority Control System And Method For Managing Concurrently Pending Data Transfer Requests", Ser. No. 09/218,377, filed concurrently herewith, which is incorporated herein by reference in tis entirety.

FIELD OF THE INVENTION

This invention relates generally to transfer request priority management in multiprocessing systems, and more particularly to a system and method for prioritizing the delivery of information transfer requests using a least-recently-serviced rotational priority technique.

BACKGROUND OF THE INVENTION

Large-scale data processing systems typically utilize a tremendous amount of memory. This is particularly true in multiprocessing systems where multiple processing units are implemented. There are several memory methodologies known in the art that provide for efficient use of memory in such multiprocessing environments. One such memory methodology is a distributed memory where each processor has access to its own dedicated memory, and access to another processor's memory involves sending messages via an inter-processor network. While distributed memory structures avoid problems of contention for memory and can be implemented relatively inexpensively, it is usually slower than other memory methodologies, such as shared memory systems.

Shared memory is used in a parallel system, or multiprocessing system, and can be accessed by more than one processor. The shared memory is connected to the multiple processing units—typically accomplished using a shared bus or network. Large-scale shared memories may be designed to cooperate with local cache memories associated with each processor in the system. Cache consistency, or coherency, protocols ensure that one processor's cached copy of a shared memory location is invalidated when another processor writes to that location.

It may be the case that the main system memory assumes the responsibility for maintaining cache coherency. Data modifications applied to a particular cache must be properly regulated and controlled to eliminate the risk of any other requesting device accessing invalid data. Control circuitry and cache directory structures may be used within the main system memory to perform these regulation and control functions. In such a case, there is no direct connectivity between the independent caches because the control circuitry must be involved in order to maintain cache coherency. Furthermore, input/output (I/O) processors must also be able to bidirectionally communicate with system processors, and cache memories operating in connection with I/O processors is also therefore regulated by the directory structures, control circuitry, and other coherency-related circuitry.

Requests for data transfers may occur at a faster rate than the memory and associated cache coherency logic can sustain. A buffering technique is typically used to queue such requests until they can be processed. However, the queuing function can sometimes result in inefficient and discriminatory request servicing. In some cases, one processor's requests may be repeatedly processed, while another's are left relatively unattended. In other cases, a processor having relatively few requests may needlessly tie up system resources by receiving unnecessary request service polls. These situations can reduce available request bandpass, and increase the probability of request stalling or request lockout.

It is desirable for data transfer requests to be managed as efficiently as possible. One method known in the art that attempts to alleviate these problems is known as a "fixed" request priority scheme. Each requester is assigned a fixed priority value, and requests are handled according to this associated priority value. Those requests having a high fixed priority value are always handled prior to those having relatively low priority values. Such a scheme leaves the lowest priority requester completely unattended unless, and until, no other requests are pending. This type of arrangement can cause request "stalls" or "lockouts", since a high priority requester might always have a request available, blocking out lower priority requesters. While this is acceptable from the high priority requester's point of view, this results in serious performance degradation for lower priority requesters.

Another request priority scheme is referred to as "snap-fixed", where input request activity is continually or periodically polled. This results in a captured "snapshot" of the request activity at a given time. All of the captured requests are processed in a fixed order until all requests in the snapshot have been processed, at which time a new snapshot is taken. While this approach is arguably better than the fixed approach, it too has its drawbacks. The snap-fixed approach can reduce or eliminate lockouts, but at a cost. A lower priority request always has to wait for all higher requests in the snapshot. This may be acceptable for a system where the high volume requesters are mixed with low volume requesters, and the low volume requesters are assigned a high priority level to compensate for the volume discrepancy. This would have very little adverse affect on the higher volume requesters since they would only occasionally be delayed. However, where the volume of all requesters is similar, this method clearly favors the requesters having higher priority assignments, and the other requesters will continually experience longer delays.

A "simple rotational" priority scheme involves changing the requester priority on a periodic basis. For example, the requester priority may be changed whenever a request is granted priority. Requester (N−1) moves to priority level (N), requester (N) moves to (N+1), and so forth. A disadvantage of a simple rotational scheme is that a requester may pass through its high priority assignment when it has no request ready, and may end up at the low end of the priority assignments when it does have a request available.

It would therefore be desirable to provide an efficient request priority arrangement and method that assigns priority based on the relative activity of each of the requesters as compared to other requesters in the system, thereby minimizing request stalling yet providing request priority where it is needed most. The present invention provides a request priority arrangement and method based on a unique, least-recently-serviced, rotational priority. Furthermore, the present invention is modular to provide for increased requester capacity, and is designed to be inherently adjustable to account for specific requester priority level assignments. The present invention offers these and other advantages over the prior art, and provides a solution to the aforementioned and other shortcomings of the prior art.

SUMMARY OF THE INVENTION

The present invention relates to a system and method for prioritizing the delivery of information transfer requests using a least-recently-serviced rotational priority technique. The invention implements a least-recently-serviced rotational priority scheme to allow inactive requesters assigned to higher priorities than a granted requester to maintain their current relative priority rank, while allowing all requesters assigned to lower priorities than the granted requester to collectively increment in priority ranking.

In accordance with one embodiment of the invention, a method is provided for prioritizing the delivery of information transfer requests in a system having one or more requesters to supply the information transfer requests. Active requesters have currently pending information transfer requests, and non-active requesters have no currently pending information transfer requests. The method includes granting transfer authorization to the information transfer request associated with the active requester that is currently assigned to the highest priority level in a range of priority levels. Each of the active and non-active requesters that have a priority level less than the priority level of the active requester that was granted the transfer have their priority levels incremented, while the non-active requesters having a priority level greater than the priority level of the active requester that was granted the transfer is maintained at its current priority level. The priority level of the active requester that was granted the transfer is then reassigned to the lowest priority level in the range of priority levels.

In accordance with another embodiment of the invention, a data transfer request prioritization circuit is provided. The prioritization circuit is for use in a data processing system that has a plurality of requesters for initiating data transfer requests, where active requesters have currently pending data transfer requests, and non-active requesters have no currently pending data transfer requests. The prioritization circuit includes a circuit for granting transfer authorization to the data transfer request associated with the active requester that is currently assigned to the highest priority level in a range of priority levels. The prioritization circuit also includes circuitry to increment the priority levels assigned to each of the active and non-active requesters having a priority level less than the priority level of the active requester that was granted the transfer, and to maintain a current priority level for each of the non-active requesters having a priority level greater than the priority level of the active requester that was granted the transfer. A priority level reassignment circuit is provided to reassign the priority level of the active requester that was granted the transfer to the lowest priority level in the range of priority levels.

Still other objects and advantages of the present invention will become readily apparent to those skilled in this art from the following detailed description. As will be realized, the invention is capable of other and different embodiments, and its details are capable of modification without departing from the scope and spirit of the invention. Accordingly, the drawing and description are to be regarded as illustrative in nature, and not as restrictive.

BRIEF DESCRIPTION OF THE DRAWINGS

The invention is described in connection with the embodiments illustrated in the following diagrams.

DETAILED DESCRIPTION OF THE ILLUSTRATED EMBODIMENTS

The present invention provides a technique for prioritizing the delivery of information transfer requests, such as memory requests, in a system where multiple requests may be concurrently pending. The invention implements a least-recently-serviced rotational priority technique to allow inactive requesters assigned to higher priorities than a granted requester to maintain their current relative priority rank, while allowing all requesters assigned to lower priorities than the granted requester to collectively increment in priority ranking. The granted requester is then reassigned to the lowest priority. The invention therefore selects one of a total number of potential information transfer requests for further processing, and ensures that each requester will be guaranteed a delay no greater than a predetermined, yet adjustable, maximum delay from the time of request initiation to the time of its transmission grant.

While the present invention is particularly advantageous in the context of a Symmetrical Multi-Processor (SMP) environment as described below, it will be appreciated by those skilled in the art that the invention is equally applicable to other computing environments requiring management of memory, I/O, or other transaction processing requests. Therefore, the SMP environment described in FIGS. 1–10 is provided for illustrative purposes and to provide a full operational understanding of the invention; however the invention is not limited thereto.

Figure 1:
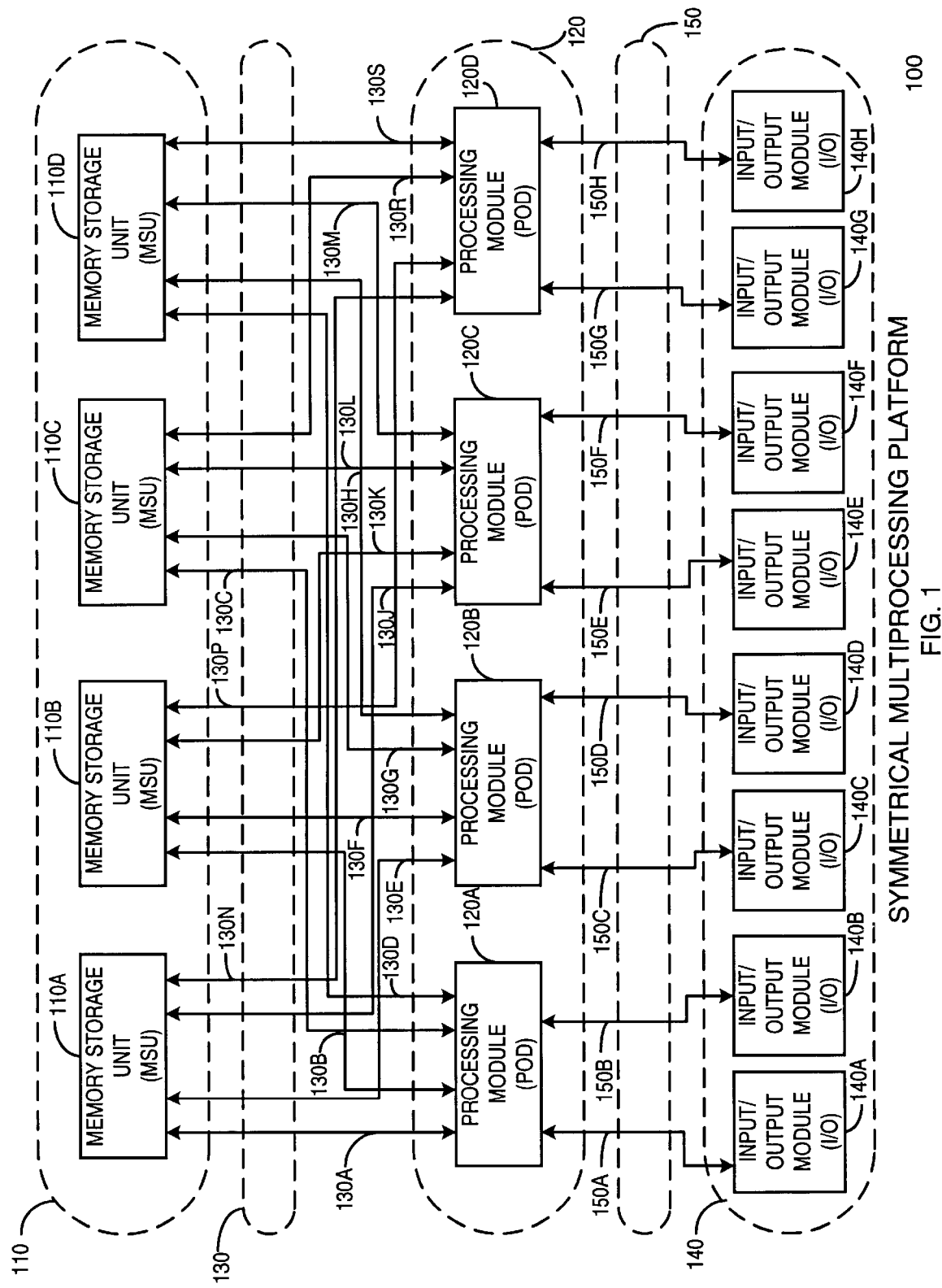
FIG. 1 is a block diagram of a Symmetrical Multi-Processor (SMP) System Platform in which the principles of the present invention may be applied.

FIG. 1 is a block diagram of a Symmetrical Multi-Processor (SMP) System Platform in which the principles of the present invention may be applied. System Platform 100 includes one or more Memory Storage Units (MSUs) in dashed block 110 individually shown as MSU 110A, MSU 110B, MSU 110C and MSU 1110D, and one or more Processing Modules (PODs) in dashed block 120 individually shown as POD 120A, POD 120B, POD 120C, and POD 120D. Each unit in MSU 110 is interfaced to all PODs 120A, 120B, 120C, and 120D via a dedicated, point-to-point connection referred to as an MSU Interface (MI) in dashed block 130, individually shown as 130A through 130S. For example, MI 130A interfaces POD 120A to MSU 110A, MI 130B interfaces POD 120A to MSU 110B, MI 130C interfaces POD 120A to MSU 110C, MI 130D interfaces POD 120A to MSU 110D, and so on.

In this example SMP environment, MI 130 comprises separate bi-directional data and bi-directional address/command interconnections, and further includes unidirectional control lines that control the operation on the data and address/command interconnections (not individually shown). The control lines operate at a system clock frequency (SYSCLK) while the data bus runs source synchronous at two times the system clock frequency (2×SYSCLK). For example, in one embodiment, the system clock frequency is approximately 100 megahertz (MHZ).

Any POD 120 has direct access to data in any MSU 110 via one of MIs 130. For example, MI 130A allows POD 120A direct access to MSU 110A and MI 130F allows POD 120B direct access to MSU 110B. PODs 120 and MSUs 110 are discussed in further detail below.

System Platform 100 further comprises Input/Output (I/O) Modules in dashed block 140 individually shown as I/O Modules 140A through 140H, which provide the interface between various Input/Output devices and one of the PODs 120. Each I/O Module 140 is connected to one of the PODs across a dedicated point-to-point connection called the MIO Interface in dashed block 150 individually shown as 150A through 150H. For example, I/O Module 140A is connected to POD 120A via a dedicated point-to-point MIO Interface 150A. The MIO Interfaces 150 are similar to the MI Interfaces 130, but may have a transfer rate that is approximately half the transfer rate of the MI Interfaces because the I/O Modules 140 are located at a greater distance from the PODs 120 than are the MSUs 110.

Figure 2:
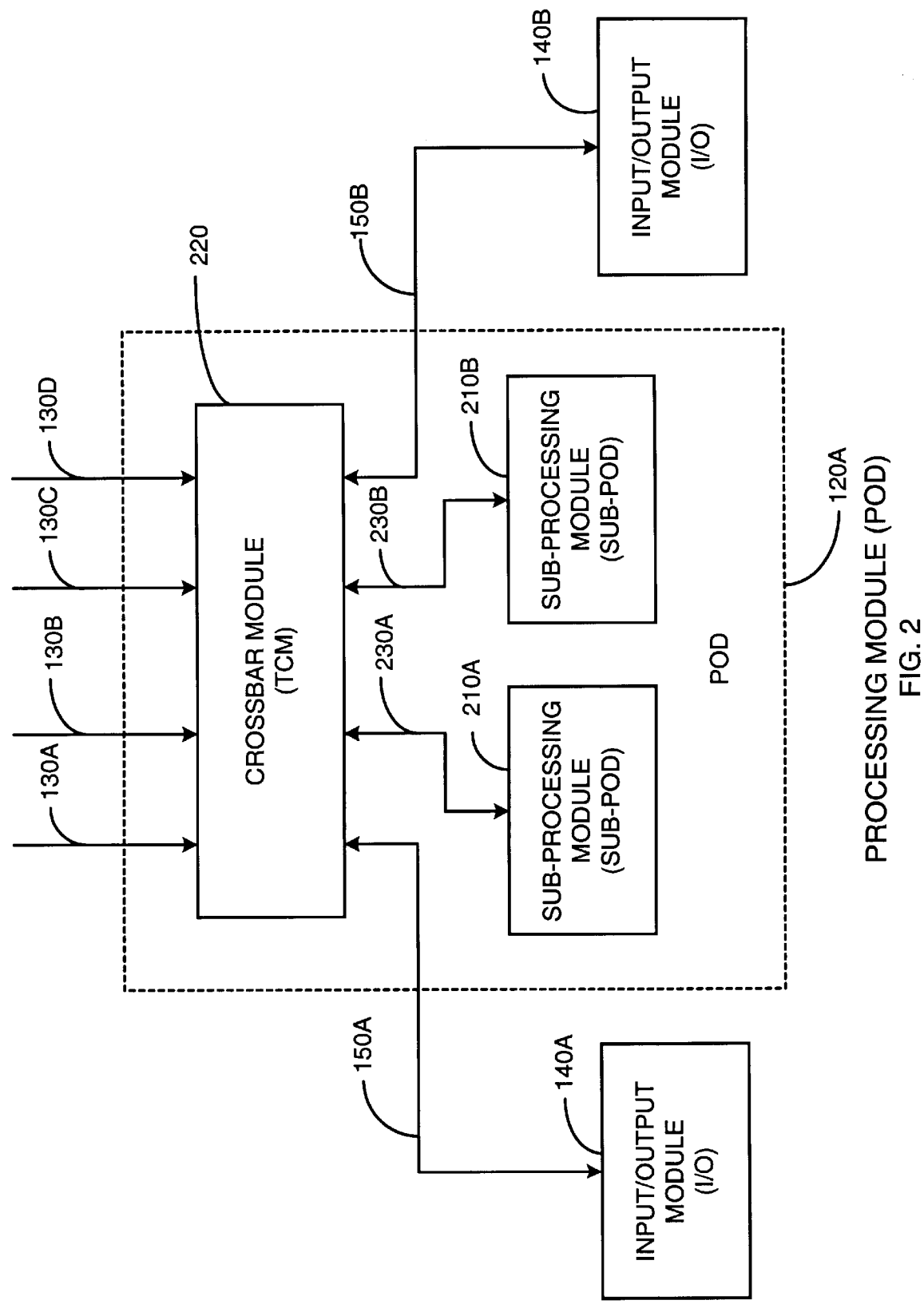
FIG. 2 is a block diagram of one embodiment of a processing module (POD) of a representative SMP.

FIG. 2 is a block diagram of one embodiment of a processing module (POD). POD 120A is shown, but each of the PODs 120A through 120D have a similar configuration. POD 120A includes two Sub-Processing Modules (Sub-PODs) 210A and 210B. Each of the Sub-PODs 210A and 210B are interconnected to a Crossbar Module (TCM) 220 through dedicated point-to-point Interfaces 230A and 230B, respectively, that are similar to the MI interconnections 130. TCM 220 further interconnects to one or more I/O Modules 140 via the respective point-to-point MIO Interfaces 150. TCM 220 both buffers data and functions as a switch between Interfaces 230A, 230B, 150A, and 150B, and MI Interfaces 130A through 130D. When an I/O Module 140 or a Sub-POD 210 is interconnected to one of the MSUs via the TCM 220, the MSU connection is determined by the address provided by the I/O Module or the Sub-POD, respectively. In general, the TCM maps one-fourth of the memory address space to each of the MSUs 110A–110D. The TCM 220 can further be configured to perform address interleaving functions to the various MSUs. The TCM may also be utilized to perform address translation functions that are necessary for ensuring that each processor (not shown in FIG. 2) within each of the Sub-PODs 210 and each I/O Module 140 views memory as existing within a contiguous address space as is required by certain off-the-shelf operating systems.

Figure 3:
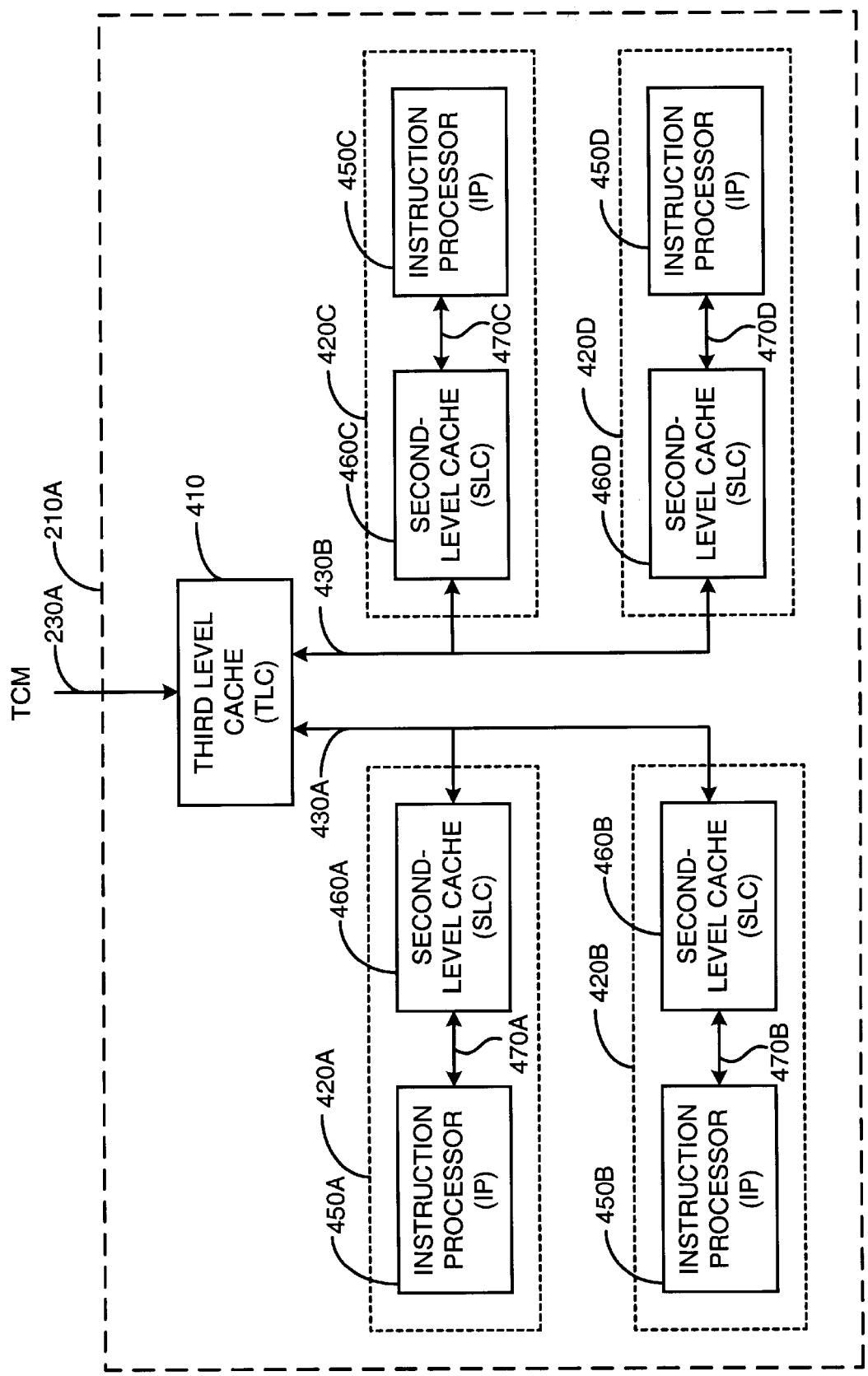
FIG. 3 is a block diagram of one example of a Sub-Processing Module (Sub-POD) of the representative SMP.

FIG. 3 is a block diagram of one example of a Sub-Processing Module (Sub-POD) 210A. Sub-POD 210A is shown, but it is understood that all Sub-PODs 210 have similar structures and interconnections. In this embodiment, Sub-POD 210A includes a Third-Level Cache (TLC) 410 and one or more Coherency Domains 420 (shown as Coherency Domains 420A, 420B, 420C, and 420D). TLC 410 is connected to Coherency Domains 420A and 420B via Bus 430A, and is connected to Coherency Domains 420C and 420D via Bus 430B. TLC 410 caches data from the MSU, and maintains data coherency among all of Coherency Domains 420, guaranteeing that each processor is always operating on the latest copy of the data.

Each Coherency Domain 420 includes an Instruction Processor (IP) 450 (shown as IPs 450A, 450B, 450C, and 450D), and a Second-Level Cache (SLC) 460 (shown as SLC 460A, 460B, 460C and 460D.) Each SLC interfaces to an IP via a respective point-to-point Interface 470 (shown as Interfaces 470A, 470B, 470C, and 470D), and each SLC further interfaces to the TLC via Bus 430 (shown as 430A and 430B.) For example, SLC 460A interfaces to IP 450A via Interface 470A and to TLC 410 via Bus 430A. Similarly, SLC 460C interfaces to IP 450C via Interface 470C and to TCL 410 via Bus 430B. Each SLC caches data from the TLC as requested by the interconnecting IP 450.

Each of the Interfaces 470 is similar to the MI Interfaces 130, but in one embodiment each of the Interfaces 470 has a transfer rate which is approximately twenty-five percent higher than the transfer rate of each of the MI Interfaces. This difference in transfer rates creates an asynchronous boundary between Interfaces 470 and the MI Interfaces 130. This asynchronous boundary is managed by staging registers in the TCM 220.

IP 450 and SLC 460 may be integrated in a single device, such as in an Pentium Pro® Processing device available from the Intel Corporation. Alternatively, the IP 450 may be a A-Series Instruction Processor or a 2200-Series Instruction Processor, both commercially available from the Unisys Corporation. In this embodiment, the IP 450 is externally coupled to an SLC 460.

In a preferred arrangement, IP 450 includes an internal First Level Cache. For example, a Pentium Pro® Processing device available from the Intel Corporation includes an internal FLC as well as an SLC. In other embodiments, IPs 450 may each utilize an external FLC or not include an FLC at all. Furthermore, in other embodiments, each Coherency Domain 420 may includes more successive levels of cache so that multiple caches exist between TLC 410 and IP 450.

Figure 4:
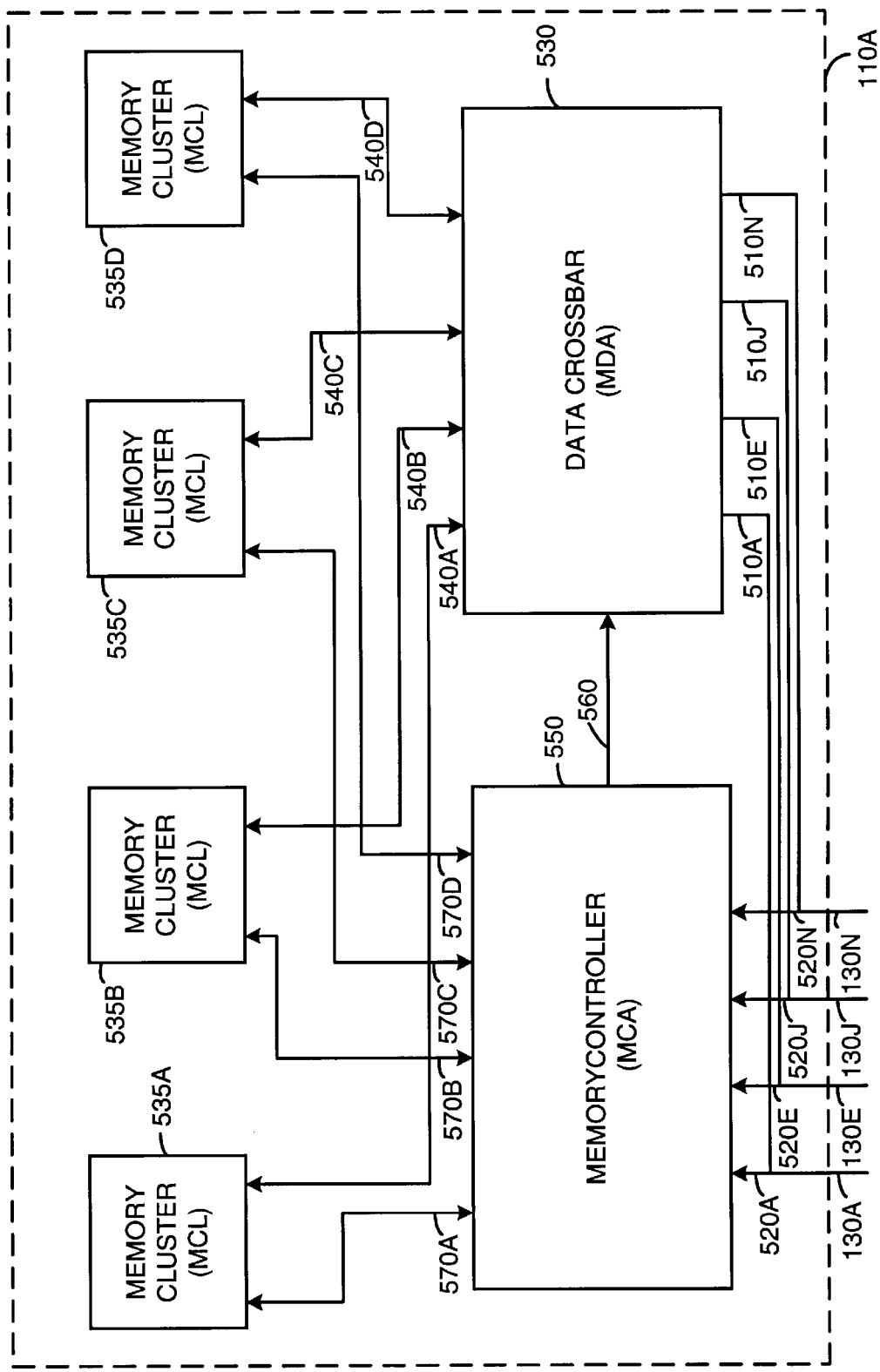
FIG. 4 is a block diagram of a Memory Storage Unit (MSU) of the representative SMP.

FIG. 4 is a block diagram of a Memory Storage Unit (MSU) 110. Although MSU 110A is shown and discussed, it is understood that this discussion applies equally to each of the MSUs 110. As discussed above, MSU 10A interfaces to each of the PODs 120A, 120B, 120C, and 120D across dedicated point-to-point MI Interfaces 130A, 130E, 130J, and 130N, respectively. Each MI Interface 130 contains Data Lines 510 (shown as 510A, 510E, 510J, and 510N) wherein each set of Data Lines 510 includes sixty-four bi-directional data bits, data parity bits, data strobe lines, and error signals (not individually shown.) Each set of Data Lines 510 is therefore capable of transferring eight bytes of data at one time. In addition, each MI Interface 130 includes bi-directional Address/command Lines 520 (shown as 520A, 520E, 520J, and 520N.) Each set of Address/command Lines 520 includes bi-directional address signals, a response signal, hold lines, address parity, and early warning and request/arbitrate lines.

A first set of unidirectional control lines from a POD to the MSU are associated with each set of the Data Lines 510, and a second set of unidirectional control lines from the MSU to each of the PODs are further associated with the Address/command Lines 520. Because the Data Lines 510 and the Address/command Lines 520 each are associated with individual control lines, the Data and Address information may be transferred across the MI Interfaces 130 in a split transaction mode. In other words, the Data Lines 510 and the Address/command Lines 520 are not transmitted in a lock-step manner.

The transfer rates of the Data Lines 510 and Address/control Lines 520 may be different, such as where the data is transferred across the Data Lines at rate of approximately 200 Mega-Transfers per Second (MT/S), and the address/command information is transferred across the Address/command Lines at approximately 100 MT/S. During a typical data transfer, the address/command information is conveyed in two transfers, whereas the associated data is transferred in a sixty-four-byte packet called a cache line that requires eight transfers to complete. The difference between data and address transfer rates and transfer lengths will be discussed further below.

Returning now to a discussion of FIG. 4, the Data Lines 510A, 510E, 510J, and 510N interface to the Memory Data Crossbar (MDA) 530. The MDA 530 buffers data received on Data Lines 510, and provides the switching mechanism that routes this data between the PODs 120 and an addressed one of the storage sub-units called Memory Clusters (MCLs) 535 (shown as 535A, 535B, 535C, and 535D.) Besides buffering data to be transferred from any one of the PODs to any one of the MCLs, the MDA 530 also buffers data to be transferred from any one of the PODs to any other one of the PODs (or even to itself to transfer data to a different Sub-POD) in a manner to be discussed further below. The MDA 530 can also receive data from any one of the MCLs 535 on each of Data Buses 540 for delivery to any one of the PODs 120.

The MDA 530 is capable of simultaneously receiving data from one or more of the MI Interfaces 130 while simultaneously providing data to all of the other MI Interfaces 130. Each of the MI Interfaces is capable of operating at a transfer rate of 64 bits every five nanoseconds (ns), or 1.6 gigabytes/second for a combined transfer rate across four interfaces of 6.4 gigbytes/second. The MDA 530 is further capable of transferring data to, or receiving data from, each of the MCLs 535 across Data Buses 540 at a rate of 128 bits every 10 ns per Data Bus 540, for a total combined transfer rate across all Data Buses 540 of 6.4 gigabytes/seconds. Data Buses 540 require twice as long to perform a single data transfer operation (10 ns versus 5 ns) as compared to Data Lines 510 because Data Buses 540 are longer and support multiple loads. It should be noted that since the MDA is capable of buffering data received from any of the MCLs and any of the PODs, up to eight unrelated data transfer operations may be occurring to and/or from the MDA at any given instant in time. Therefore, as mention above, the MDA is capable of routing data at a combined peak transfer rate of 12.8 gigabytes/second.

Control for the MDA 530 is provided by the Memory Controller (MCA) 550. MCA queues memory requests, and provides timing and routing control information to the MDA across Control Lines 560. The MCA 550 also buffers address, command and control information received on Address /command lines 520A, 520E, 520J, and 520N, and provides request addresses to the appropriate memory device across Address Lines 570 (shown as 570A, 570B, 570C, and 570D) in a manner to be described further below. For operations that require access to the MCLs 535, the address information determines which of the MCLs 535 will receive the memory request. The command information indicates which type of operation is being performed. Possible commands include Fetch, Flush, Return, I/O Overwrite, and Message Transfer. The control information provides timing and bus arbitration signals which are used by distributed state machines within the MCA 550 and the PODs 120 to control the transfer of data and address/commands between the PODs and the MSUs. The use of the address, command, and control information will be discussed further below.

The memory associated with MSU 110A is organized into up to four Memory Clusters (MCLs) shown as MCL 535A, MCL 535B, MCL 535C, and MCL 535D. However, the MSU may be populated with as few as one MCL if the user so desires. In one arrangement, each MCL includes arrays of Synchronous Dynamic Random Access memory (SDRAM) devices and associated drivers and transceivers. MCL 535A, 535B, 535C, and 535D is each serviced by one of the independent bi-directional Data Buses 540A, 540B, 540C, and 540D, respectively, where each of the Data Buses 540 includes 128 data bits. Each MCL 535A, 535B, 535C, and 535D is further serviced by one of the independent set of the Address Lines 570A, 570B, 570C, and 570D, respectively.

In one embodiment, an MCL 535 requires 20 clock cycles, or 200 ns, to complete a memory operation involving a cache line of data. In contrast, each of the Data Buses 540 are capable of transferring a 64-byte cache line of data to/from each of the MCLs 535 in five bus cycles, wherein each bus cycle corresponds to one clock cycle. This five-cycle transfer includes one bus cycle for each of the four sixteen-byte data transfer operations associated with a 64-byte cache line, plus an additional bus cycle to switch drivers on the bus. To resolve the discrepancy between the faster transfer rate of the Data Buses 540 and the slower access rate to the MCLs 535, the system is designed to allow four memory requests to be occurring simultaneously but in varying phases of completion to a single MCL 535. To allow this interlacing of requests to occur, each set of Address Lines 570 includes two address buses and independent control lines as discussed below in reference to FIG. 5.

Before discussing the memory structure in more detail, the data coherency scheme of the current system is discussed. Data coherency involves ensuring that each POD 120 operates on the latest copy of the data. Since multiple copies of the same data may exist within platform memory, including the copy in the MSU and additional copies in various local cache memories (local copies), some scheme is needed to control which data copy is considered the "latest" copy.

The platform of the current invention uses a directory protocol to maintain data coherency. In a directory protocol, information associated with the status of units of data is stored in memory. This information is monitored and updated by a controller when a unit of data is requested by one of the PODs 120. In one embodiment of the present invention, this information includes the status of each 64-byte cache line. The status is updated when access to a cache line is granted to one of the PODs. The status information includes a vector which indicates the identity of the POD(s) having local copies of the cache line.

In the platform of the present invention, the status of the cache line includes "shared" and "exclusive." Shared status means that one or more PODs have a local copy of the cache line for read-only purposes. A POD having shared access to a cache line may not update the cache line. Thus, for example, PODs 120A and 120B may have shared access to a cache line such that a copy of the cache line exists in the Third-Level Caches 410 of both PODs for read-only purposes.

In contrast to shared status, exclusive status, which is also referred to as exclusive ownership, indicates that only one POD "owns" the cache line. A POD must gain exclusive ownership of a cache line before data within the cache line may be modified. When a POD has exclusive ownership of a cache line, no other POD may have a copy of that cache line in any of its associated caches.

Before a POD can gain exclusive ownership of a cache line, any other PODs having copies of that cache line must complete any in-progress operations to that cache line. Then, if one or more POD(s) have shared access to the cache line, the POD(s) must designate their local copies of the cache line as invalid. This is known as a Purge operation. If, on the other hand, a single POD has exclusive ownership of the requested cache line, and the local copy has been modified, the local copy must be returned to the MSU before the new POD can gain exclusive ownership of the cache line. This is known as a "Return" operation, since the previous exclusive owner returns the cache line to the MSU so it can be provided to the requesting POD, which becomes the new exclusive owner. Both the Purge and Return operations are initiated by the MSU, since it contains and manages the directory. In addition, the updated cache line is written to the MSU sometime after the Return operation has been performed, and the directory state information is updated to reflect the new status of the cache line data. In the case of either a Purge or Return operation, the POD(s) having previous access rights to the data may no longer use the old local copy of the cache line, which is invalid. These POD(s) may only access the cache line after regaining access rights in the manner discussed above.

In addition to Return operations, PODs also provide data to be written back to an MSU during Flush operations as follows. When a POD receives a cache line from an MSU, and the cache line is to be copied to a cache that is already full, space must be allocated in the cache for the new data. This requires a mechanism to determine which older cache line(s) will be disposed of, or "aged out of" cache to provide the amount of space needed for the new information. If the older data has never been modified, it may be merely overwritten with the new data. However, if the older data has been modified, the cache line including this older data must be written back to the MSU 110 during a Flush Operation so that this latest copy of the data is preserved.

Data is also written to an MSU 110 during I/O Overwrite operations. An I/O Overwrite occurs when one of the I/O Modules 140 issues an I/O Overwrite command to the MSU. This causes data provided by the I/O Module to overwrite the addressed data in the MSU. The Overwrite operation is performed regardless of which other PODs have local copies of the data when the Overwrite operation is performed. The directory state information is updated to indicate that the affected cache line(s) is "Present" in the MSU, meaning the MSU has ownership of the cache line and no valid copies of the cache line exist anywhere else in the system.

In addition to having ownership following an Overwrite operation, the MSU is also said to have ownership of a cache line when the MSU has the most current copy of the data and no other agents have a valid local copy of the data. This could occur, for example, after a POD having exclusive data ownership performs a Flush operation of one or more cache lines so that the MSU thereafter has the only valid copy of the data.

Figure 5:
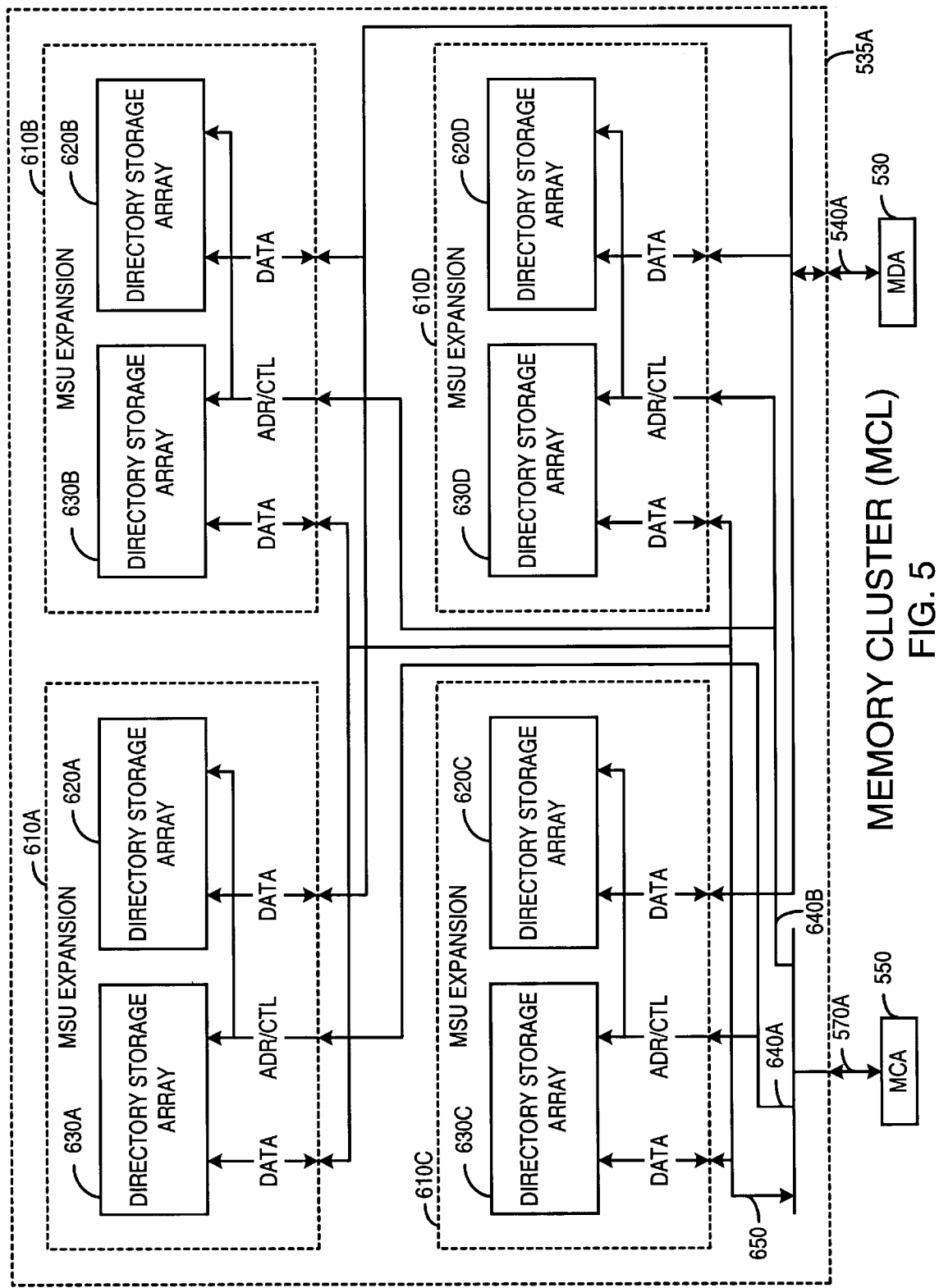
FIG. 5 is a block diagram of a Memory Cluster (MCL) of the representative SMP.

FIG. 5 is a block diagram of a Memory Cluster (MCL) 535A. Although MCL 535A is shown and described, the following discussion applies equally to all MCLs 535. An MCL contains between one and four MSU Expansions 610A, 610B, 610C, and 610D as dictated by user needs. A minimally-populated MSU 110 will contain at least one MSU Expansion 610. Each MSU Expansion 610 includes two Dual In-line Memory Modules (DIMMs, not individually shown). Since a fully populated MSU 110 includes up to four MCLs 535, and a fully populated MCL includes up to four MSU Expansions, a fully populated MSU 110 includes up to 16 MSU Expansions 610 and 32 DIMMs. The DIMMs can be populated with various sizes of commercially available SDRAMs as determined by user needs. In one embodiment, the DIMMs are populated with either 64 Mbyte, 128 Mbyte, or 256 Mbyte SDRAMs. Using the largest capacity DIMM, the MSU 110 has a maximum capacity of eight gigabytes of data storage, or 32 gigabytes of data storage in a SMP Platform 100 having four MSUs. Additional storage is provided for the directory state information, and parity and error bits to be discussed below.

Each MSU Expansion 610 contains two arrays of logical storage, Data Storage Array 620 (shown as 620A, 620B, 620C, and 620D) and Directory Storage Array 630 (shown as 630A, 630B, 630C, and 630D.) MSU Expansion 610A includes Data Storage Array 620A and Directory Storage Array 630A, and so on.

In one arrangement, each Data Storage Array 620 is 128 data bits wide, and accommodates 28 check bits, and four error bits (not individually shown.) This information is divided into four independent Error Detection and Correction (ECC) fields, each including 32 data bits, seven check bits, and an error bit. An ECC field provides Single Bit Error Correction (SBEC), Double Bit Error Detection (DED), and guarantees error detection within a field of any four adjacent data bits. Since each Data Storage Array 620 is composed of SDRAM devices which are each eight data bits wide, full device failure detection can be ensured by splitting the eight bits from each SDRAM device into separate ECC fields.

Each of the Data Storage Arrays 620 interfaces to the bi-directional Data Bus 540A which also interfaces with the MDA 530. Each of the Data Storage Arrays further receives selected ones of the unidirectional Address Lines 570A driven by the MCA 550. As discussed above, each of the Address Lines 570A includes two Address Buses 640 (shown as 640A and 640B), one for each pair of MSU Expansions 610. Data Storage Arrays 620A and 620C receive Address Bus 640A, and Data Storage Arrays 620B and 620D receive Address Bus 640B. This dual address bus structure allows multiple memory transfer operations to be occurring simultaneously to each of the Data Storage Arrays within an MCL 535, thereby allowing the slower memory access rates to more closely match the data transfer rates achieved on Data Buses 540. This will be discussed further below.

Each addressable storage location within the Directory Storage Arrays 630 contains nine bits of directory state information and five check bits for providing single-bit error correction and double-bit error detection on the directory state information. The directory state information includes the status bits used to maintain the directory coherency scheme discussed above. Each of the Directory Storage Arrays is coupled to one of the Address Buses 640 from the MCA 550. Directory Storage Arrays 630A and 630C are coupled to Address Bus 640A, and Directory Storage Arrays 630B and 630D are coupled to Address Bus 640B. Each of the Directory Storage Arrays further receive a bi-directional Directory Data Bus 650, which is included in Address Lines 570A, and which is used to read and update the directory state information.

The Data Storage Arrays 620 provide the main memory for the SMP Platform. During a read of one of the Data Storage Arrays 620 by one of the Sub-PODs 210 or one of the I/O modules 140, address signals and control lines are presented to a selected MSU Expansion 610 in the timing sequence required by the commercially-available SDRAMs populating the MSU Expansions. The particular MSU Expansion is selected based on the request address. After a fixed delay, the Data Storage Array 620 included within the selected MSU Expansion 610 provides the requested cache line during a series of four 128-bit data transfers, with one transfer occurring every 10 ns. After each of the transfers, each of the SDRAMs in the Data Storage Array 620 automatically increments the address internally in predetermined fashion. At the same time, the Directory Storage Array 630 included within the selected MSU Expansion 610 performs a read-modify-write operation. Directory state information associated with the addressed cache line is provided from the Directory Storage Array across the Directory Data Bus 650 to the MCA 550. The MCA updates the directory state information and writes it back to the Directory Storage Array in a manner to be discussed further below.

During a memory write operation, the MCA 550 drives Address Lines 640 to the one of the MSU Expansions 610 selected by the request address. The Address Lines are driven in the timing sequence required by the commercially-available SDRAMs populating the MSU Expansion 610. The MDA 530 then provides the 64 bytes of write data to the selected Data Storage Array 620 using the timing sequences required by the SDRAMs. Address incrementation occurs within the SDRAMs in a similar manner to that described above.

Figure 6:
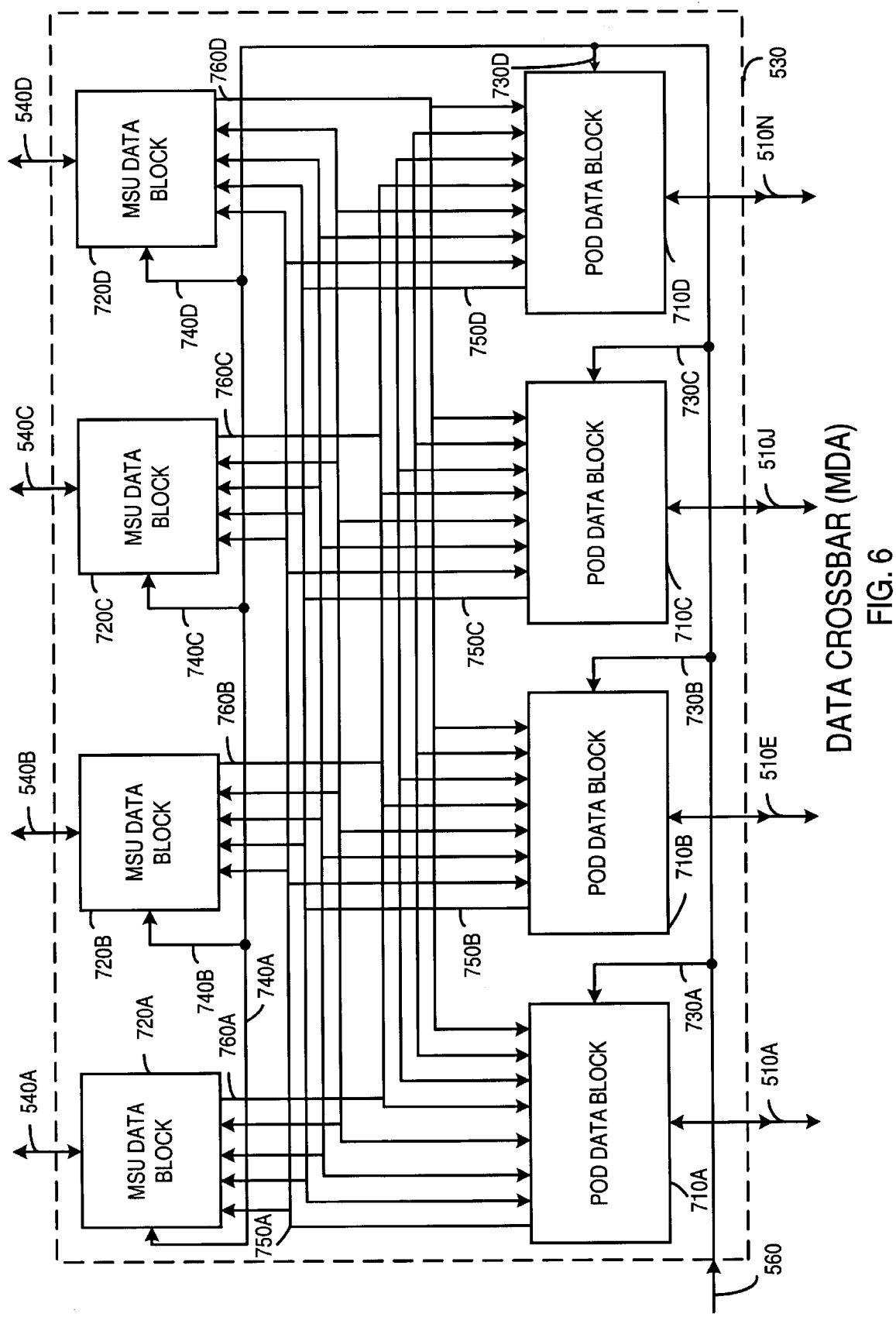
FIG. 6 is a block diagram of a Data Crossbar (MDA) in the representative SMP.

FIG. 6 is a block diagram of the Data Crossbar (MDA) 530. Although MDA 530 of MSU 10A is shown and discussed, this discussion applies equally to all MDAs 530 in the system. POD Data Blocks 710, shown as POD Data Blocks 710A, 710B, 710C, and 710D interface to PODs 120A, 120B, 120C, and 120D, respectively, over Data Lines 510A, 510E, 510J, and 510N, respectively. POD Data Blocks 710 buffer the data sent to, and received from, the respective one of the PODs 120. MDA 530 further includes MSU Data Blocks 720A, 720B, 720C, and 720D, which are interconnected to MCLs 535A, 535B, 535C, and 535D over Data Buses 540A, 540B, 540C, and 540D, respectively. MSU Data Blocks 720 buffer the data sent to, and received from, the respective MCL 535. The MCA 550 provides the control for the POD Data Blocks 710 and the MSU Data Blocks 720 on Control Line 560. Control Line 560 includes independent control lines to each of the POD Data Blocks 710 (shown as POD Data Block Control Lines 730A, 730B, 730C, and 730D) so that each POD Data Block 710 can run in parallel. Control line 560 further includes independent control lines to each of the MSU Data Blocks (shown as MSU Data Block Control Lines 740A, 740B, 740C, and 740D) so that each MSU Data Block 720 can run in parallel.

Each POD Data Block 710 drives all of the MSU Data Blocks 720 and all other POD Data Blocks 710 on Lines 750 (shown as 750A, 750B, 750C, and 750D) with two independent 128-bit sets of data signals (not individually shown). For example, POD Data Block 710A drives Line 750A, which includes two independent 128-bit sets of data signals that are each driven to each of the MSU Data Blocks 720, and to each of the other POD Data Blocks 710. Each of the independent 128-bit sets of data signals included in each of Lines 750 are unidirectional and are used to transfer updated memory data to a selected one of the MSU Data Blocks 720 during a Return, Flush, or I/O Overwrite Operation. Each of the sets of data signals on Lines 750 also transfers message data or an updated cache line from one POD 120 to an another POD during Message or Return Operations, respectively.

Each MSU Data Block 720 drives all of the POD Data Blocks 710 on Lines 760 (shown as 760A, 760B, 760C, and 760D). Each of Lines 760 include two independent 128-bit sets of data signals that drive each of the POD Data Blocks 710. For example, MSU Data Block 720A drives Line 760A, which includes two independent 128-bit sets of data signals that are each driven to each of the POD Data Blocks 710. Each of the independent 128-bit sets of data signals included in each of Lines 750 are unidirectional and are used to transfer data from the MCLs 535 to the PODs 120 during read operations when the directory state information associated with the addressed cache line indicates the cache line is "Present" in the MSU, indicating that the most recent copy of the data is owned by the MSU 110.

Figure 7:
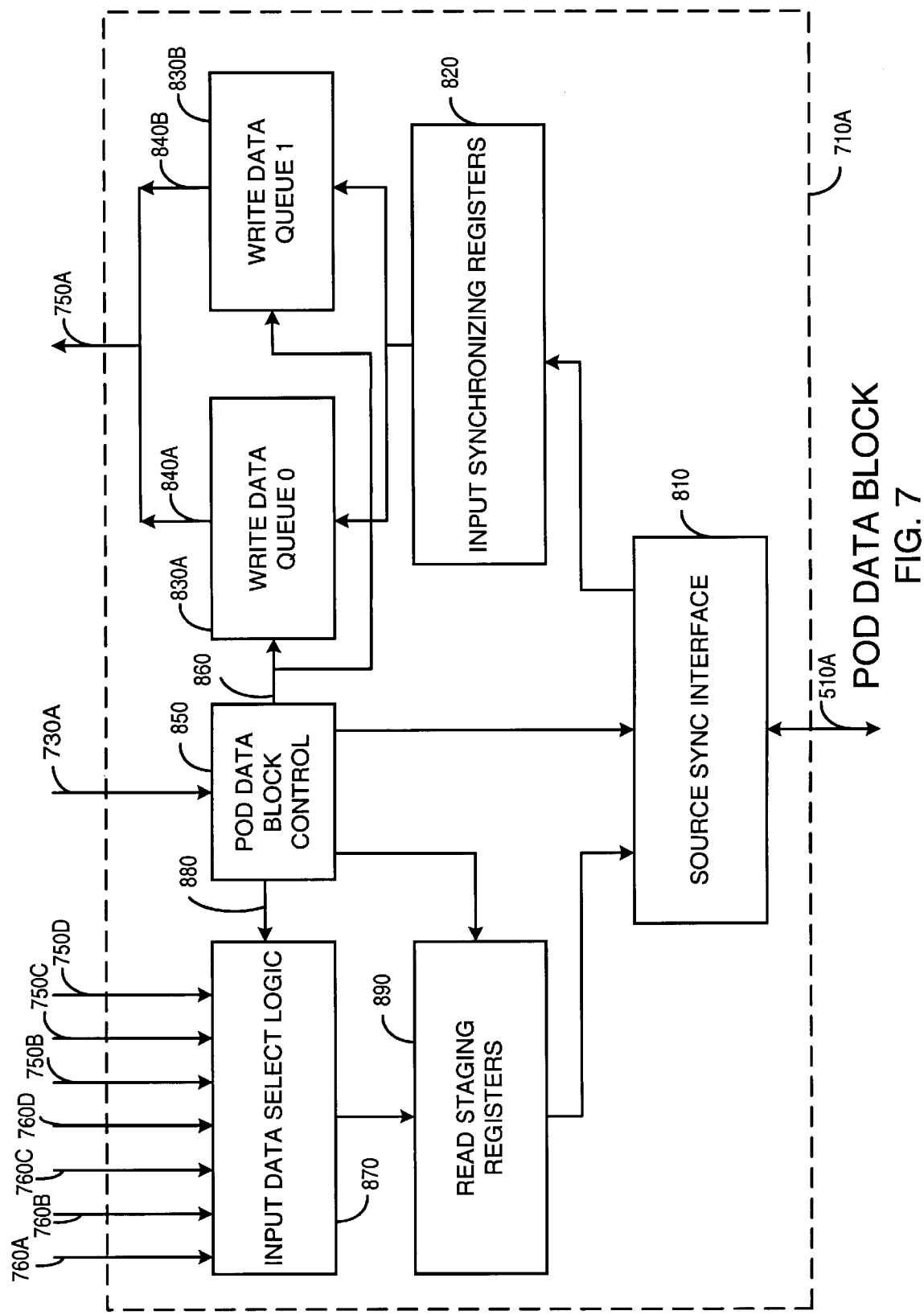
FIG. 7 is a block diagram of a POD Data Block in the representative SMP.

FIG. 7 is a block diagram of POD Data Block 710A. Although POD Data Block 710A is shown and described, the discussion applies to any of the POD Data Blocks 710. As discussed above, the POD Data Blocks buffer and route data between the PODs 120 and the MSU Data Blocks 720. The data may include cache lines from either one of the PODs 120 or one of the MCLs 535, or may comprise message data from one of the PODs.

When data is received from one of the PODs during a Return, Flush, I/O Overwrite, or a Message Operation, the Source Sync Interface 810 receives data on 64-bit Data Lines 510A using strobe lines which are provided by POD 120A along with the data. The Source Sync Interface provides the data to the Input Synchronizing Registers 820, where the data is captured by latches on the active edge of the MSU clock without adding any metastability wait periods. This provides maximum throughput.

After the data is synchronized within the MSU 110A, the data is routed to either Write Data Queue-0 830A or Write Data Queue-1 830B depending on which one is least full. If both of the Write Data Queues contain an equal number of write requests, the data is routed to Write Data Queue-0 830A. Each of the Write Data Queues can store up to eight cache lines of data.

As mentioned above, Line 750A includes two independent 128-bit sets of Data Signals labelled 840A and 840B. Write Data Queue-0 830A drives Data Signals 840A, and Write Data Queue-1 830B drives Data Signals 840B. Both of these sets of Data Signals 840A and 840B are provided to all of the MSU Data Blocks 720, and to all other POD Data Blocks 710 (as well as internally within the POD Data Block), and both may be driven simultaneously.

During transfer operations, MCA 550 provides control signals on one(s) of the POD Data Block Control Lines 730 and one(s) of the MSU Data Block Control Lines 740 to enable the requested transfer of data as determined by the addresses on Address/command Lines 520. If a POD Data Block 710 is sending the data, control information is received on Control Line 730 (shown as Control Line 730A) by POD Data Block Control 850. In turn, POD Data Block Control 850 generates control signals on Line 860 which enables one of the Write Data Queues 830. The selected one of the Write Data Queues 830 drives the respective one of the Data Signals 840 with the selected cache line, thereby providing data to either an MSU Data Block 720, or to another POD Data Block 710.

If the POD Data Block 710 is receiving data, the data may be received either from another POD 710 (for example, during a Return or a Message Operation), or the data may be received from an MSU Data Block 720 (during a Fetch operation.) When data is received from another POD Data Block 710, the data is received on the respective one of Lines 750 (shown as 750B, 750C, and 750D) by Input Data Select Logic 870. POD Data Block Control 850 provides control signals on Line 880 to enable Input Data Select Logic 870 to select the data and route it to the Read Staging Registers 890 where it is temporarily stored. Since the Source Sync Interface 810 is bi-directional, and since POD 120A may be sending data on Data Lines 510A at any instant in time, the data stored in the Read Staging Registers 890 may be held for a short period of time before the interface becomes available. Read Staging Registers 890 eventually provides the data to the Source Sync Interface 810, which in turn forwards it to POD 120A via Data Lines 510A. If the data was instead received from one of the MSU Data Blocks 720, the transfer operation would be similar to that discussed above except the data would be received by Input Data Select Logic 870 on the respective one of Lines 760A, 760B, 760C, or 760D.

The POD Data Block is capable of staging data into the Read Staging Registers 890 at the same time the Source Sync Interface is receiving data from, or transferring unrelated data to, POD 120A. Meanwhile, both Write Data Queues 830A and 830B may each be providing data to a respective one of the MSU Data Blocks 720 or POD Data Blocks 710. Therefore, four transfer operations involving POD 120A can be occurring simultaneously.

Figure 8:
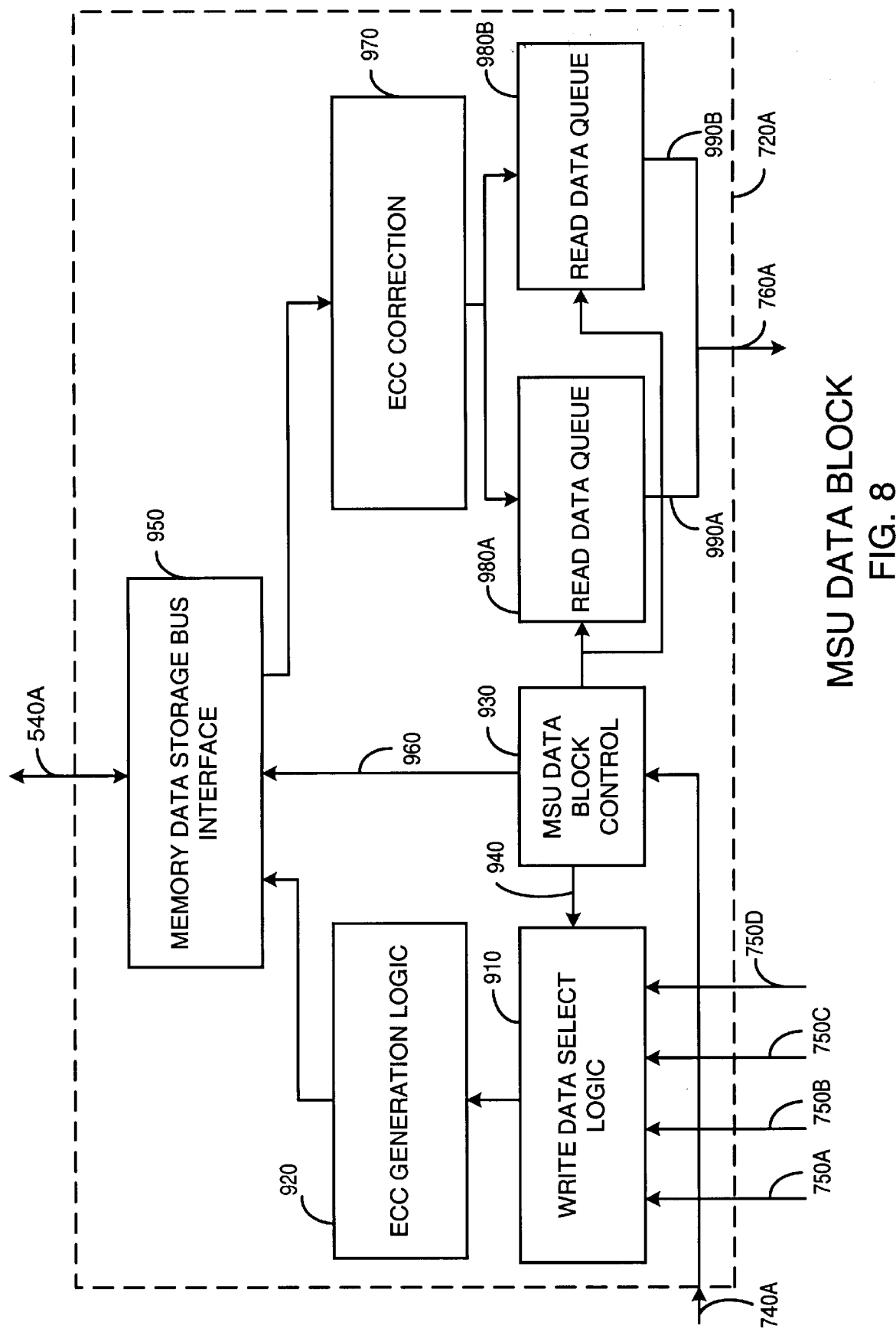
FIG. 8 is a block diagram of a MSU Data Block in the representative SMP.

FIG. 8 is a block diagram of the MSU Data Block 720. Although MSU Data Block 720A is shown and described, it is understood that this discussion applies equally to all MSU Data Blocks 720. The MSU Data Blocks buffer and route data between POD Data Blocks 710 and the MCLs 535. During a POD-to-MCL write operation, data is received from one(s) of the POD Data Blocks 710A, 710B, 710C, and 710D on Lines 750A, 750B, 750C, 750D, respectively. As discussed above, each of Lines 750 includes two independent 128-bit sets of data signals that can each be transferring data simultaneously during two different data transfer operations. The Write Data Select Logic 910 selects the appropriate set of data signals to be routed to ECC Generation Logic 920. The data selection is controlled by MSU Data Block Control 930, which receives MSU Data Block Control Line 740A from the MCA 550 and in turn generates Control Line 940 to the Write Data Select Logic.

After the 128 bits of data is routed to the ECC Generation Logic 920, the ECC Generation Logic strips the parity and generates the appropriate check bits required for the Single-Bit Error Correction/Double-Bit Error Detection (SBEC/DED) scheme employed to protect the data integrity. The ECC Generation Logic 920 transfers the data to the Memory Data Storage Bus Interface 950, which is capable of storing two cache lines of data. A cache line is stored within Memory Data Storage Bus Interface prior to being transferred to an MCL so that once the actual memory operation to the MCL is initiated, the time required to transfer the data from a POD Data Block 710 to an MSU Data Block 720 is not imposed as overhead in the ensuing memory operation. The MSU Data Block Control 930 provides control information to the Memory Data Storage Bus Interface 950 on Line 960, thereby enabling the Memory Data Storage Bus Interface so that data is provided on Data Bus 540A to MCL 535A according to the timing sequence required by the SDRAMs within the MSU Expansions 610.

During a read operation, the MCA 550 provides control information to the MSU Data Block Control 930 on Line 740A prior to data being received from MCL 535A on Data Bus 540A. In response, MSU Data Block Control 930 generates control signals which are provided on Line 960 to the Memory Data Storage Bus Interface 950 to allow the Memory Data Storage Bus Interface to receive the data from the addressed one of the MSU Expansions 610 within MCL 535A. As this data is being read, it is passed to the ECC Correction Logic 970 which corrects any single bit errors and detects multiple bit errors (MUE)s. If a MUE is detected, an error indicator is returned with the data to the requesting POD 120 so the error can be handled.

After being processed by the ECC Correction Logic 970, the data is provided to one of two Read Data Queues 980A and 980B. The data is stored in the Read Data Queue which is least full. Each Read Data Queue 980 can store up to four cache lines of data. When the stored data reaches the front of the Read Data Queue 980A or 980B, it is provided on the associated one of the Data Lines 990A or 990B, respectively, to the selected one of the POD Data Blocks 710 as controlled by MCA 550. Each of the Data Lines 990 includes 128 bits, and each of the Data Lines is capable of performing transfers simultaneously. Data Lines 990A and 990B are shown collectively as Lines 760A. MSU Data Block 720A is therefore capable of performing three transfer operations in parallel, data may be routed from one of Lines 750 to Data Bus 540A at the same time a data transfer is being performed on each of Lines 990A and 990B to a respective POD Data Block 710.

Figure 9:
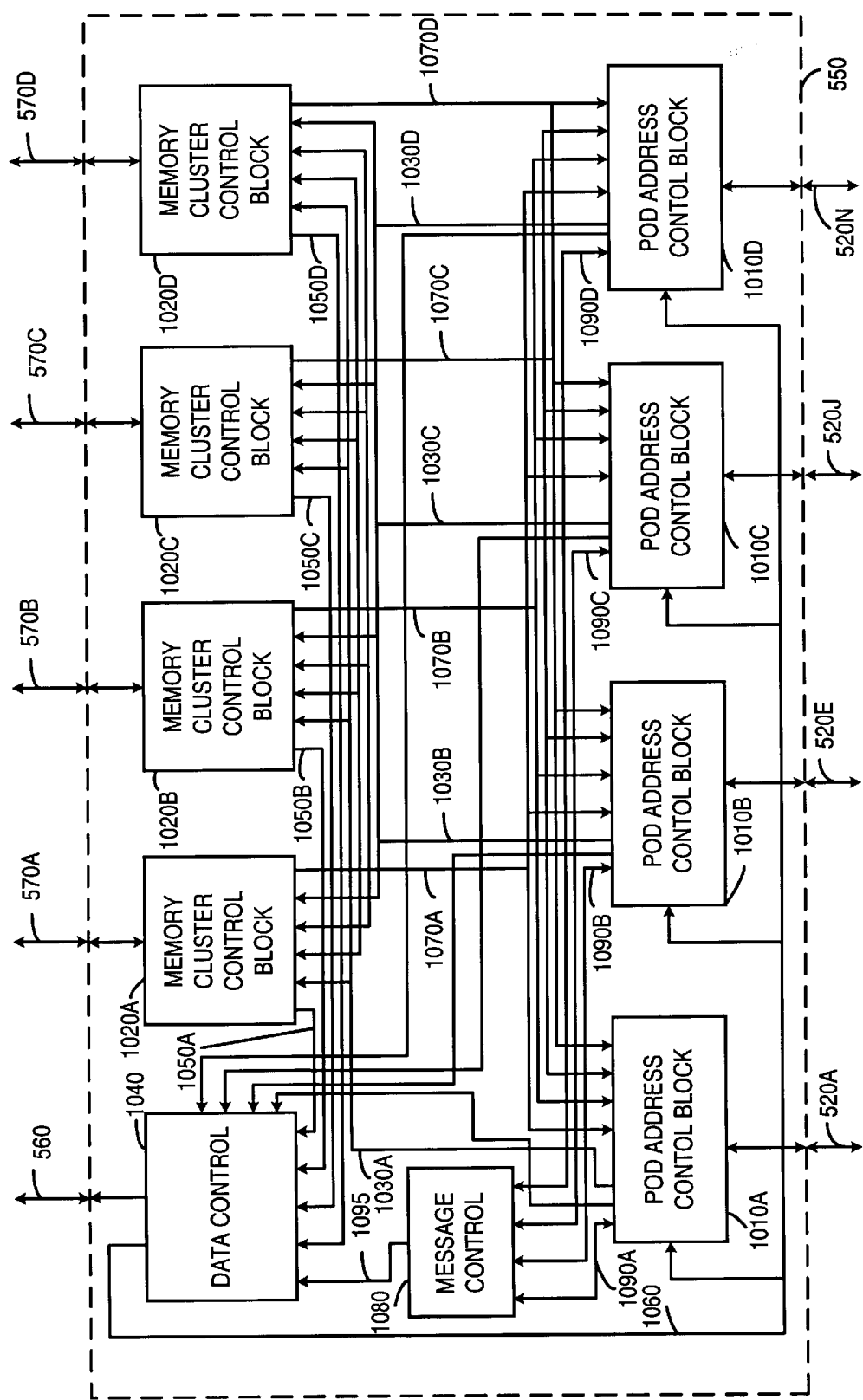
FIG. 9 is a block diagram of a Memory Controller (MCA) in the representative SMP.

FIG. 9 is a block diagram of the Memory Controller (MCA) 550. Although the following discussion specifically describes logic within MSU 110A, it is understood that this discussion applies equally to all MCAs included within all MSUs within Platform 100. The MCA 550 provides the control for data transfers occurring within the MDA 530. As discussed above, these transfers basically involve three types of operations: writing a cache line from a POD 120 to an MCL 535, reading a cache line from an MCL 535 to a POD 120, and transferring data (either message or Return data) from one POD 120 to another POD 120. MCA 550 controls each of these operations which are described in turn below.

A POD 120 writes a cache line to an MCL in three situations: during Flush, I/O Overwrite, and Return Operations. The MCA operation during a Return Operation is discussed below in association with the execution of Fetch operations, and the MCA operation during Flush and Overwrite operations is discussed as follows.

Flush operations occur when modified data is aged out of a POD's Second Level Cache 460 or Third Level Cache 410 and is written back to one of the MSUs 110. I/O Overwrite operations occur when the I/O is providing new data that is to replace whatever data currently is stored within a specified address within a MSU. In either instance, logic within the Crossbar Module 220 of the requesting one of the PODs 120A, 120B, 120C, and 120D determines which MSU 110 is mapped to a particular request address. As discussed above, each MSU is mapped to a predetermined range or range(s) of addresses within the entire range of the main memory address space.

The POD provides the address and associated command to the appropriate MSU 110 via respective ones of the Address/command Lines 520. For example, POD 120A provides an address and command over Address/command Lines 520A to POD Address Control Block 1010A, and so on. Address/command Lines 520 include bidirectional address signals, an output response signal, and various request, arbitrate and hold lines to control the flow of information to and from the respective one of the PODs 120. The address, command, and associated control information is stored within a respective one of the POD Address Control Blocks 1010A, 1010B, 1010C, and 1010D until it is selected as being associated with the next request to process. When an address is selected as the next request address to process, it is provided to a selected one of the Memory Cluster Control Blocks 1020A, 1020B, 1020C, and 1020D via unidirectional address/control signals shown as Lines 1030A, 1030B, 1030C, and 1030D, respectively, based on the address. In a fully populated MSU, each of the Memory Cluster Control Blocks 1020 handles one-fourth of the address range of the MSU. The selected Memory Cluster Control Blocks 1020A, 1020B, 1020C, and 1020D stores an address until it is selected for presentation to the associated MCL 535A, 535B, 535C, and 535D, respectively, across Address Lines 570A, 570B, 570C, and 570D, respectively. For example, addresses from Memory Cluster Control Block 1020A are presented to MCL 535A across Address Lines 570A, and so on. Memory Cluster Control 1020 selects an address for transfer to an MCL 535 based on which MSU Expansion 610 within the MCL 535 becomes available first to accept another request as will be discussed further below.

When a Memory Cluster Control Block 1020 selects an address for transfer to one of the MCLs 535, the Memory Cluster Control Block makes a request to Data Control 1040 on an associated Request Line 1050 (shown as Request Lines 1050A, 1050B, 1050C, and 1050D). For example, prior to a transfer of an address from Memory Cluster Control Block 1020A to MCL 535A, Memory Cluster Control Block makes a request on Line 1050A to Data Control 1040. In response, Data Control 1040 provides the necessary control information on Line 560 to the POD Data Block 710 and MSU Data Block 720 participating in the transfer. During a Flush or I/O Overwrite operation, the appropriate one of the POD Data Blocks 710 is enabled to provide data to one of the MSU Data Blocks 720, which in turn is enabled to provide data to the associated one of the MCLs 535. This occurs as the address is provided by the associated one of the Memory Cluster Control Blocks 1020 to the MCL.

Turning now to the operation of the MCA 550 during Fetch operations, Fetch operations are initiated in the same manner as described above. One of the PODs 120 provides the request address to the respective one of the POD Address Control Blocks 1010, where the address is queued, and eventually transferred to the addressed Memory Cluster Control Block 1020. When the address is selected as the next address to be presented to the associated MCL 535, the Memory Cluster Control Block 1020 issues a request to the Data Control 1040. Sometime after the request is made, the Data Control 1040 provides the associated control to the MDA 530 on Line 560 to enable the appropriate MSU Data Block 720 to receive the cache line from the addressed MCL 535. The cache line is stored in a Read Data Queues 980 that resides in the MSU Data Block 720 prior to being provided to the corresponding POD Data Block 710.

In addition to the cache line, the MCL 535 also provides nine bits of directory state information from the addressed Directory Storage Arrays 630 to the MCA 550 over the respective one of Lines 570. Logic in the associated Memory Cluster Control Block uses the directory state information to determine if the cache line is present in the MSU 110, meaning that the MSU "owns" the latest copy of the cache line data. If the MSU does own the requested cache line, the MCA controls the transfer of the cache line from the MSU Data Block 720 to the POD Data Block 710 associated with the requesting POD, and further controls the subsequent transfer of the cache line to the requesting POD. As the data is being provided to the POD Data Block 710, Data Control 1040 also provides control information on Line 1060 which causes the appropriate POD Address Control Block 1010 to issue the required response for the transfer. During a Fetch operation, the response is generated to the requesting POD when the first data transfer for a cache line is provided on lines 510. Part of the information in the response includes a "job number" used to associate the data with a particular request. The job number is necessary because a POD may have up to sixteen requests pending to main memory at any given time, and these requests may not necessarily be serviced in order. Therefore, the POD must be informed as to which outstanding request is associated with the returned data.

As discussed above, a POD may also initiate a Fetch operation for a cache line that the MSU does not own. If the directory state information retrieved from the Directory Storage Array 630 indicates another POD has exclusive ownership of that data, the MCA controls initiation of a Return Operation. This results in the retrieval of the latest copy of the cache line from the POD 120 that owns the data. In these cases, the MCA transfers the address associated with the requested cache line from the Memory Cluster Control Block 1020 to the appropriate one of the POD Address Control Blocks 1010A, 1010B, 1010C or 1010D over the associated interface shown as Line 1070A, 1070B, 1070C, or 1070D, respectively. Since each Memory Cluster Control 1020 operates independently, there is a separate address bus from each Memory Cluster Control Block to each POD Address Control Block 1010 such that each POD Address Control Block can receive up to four address requests simultaneously. The POD Address Control Block stores the pending request addresses until they can be presented in a serial manner to the associated POD over bidirectional Address/command Lines 520 along with a Return function.

When an address and an associated Return function are presented to a POD 120 over the associated Address/command Lines 520, the address is forwarded to the cache (either the Third Level Cache 410 or a Second Level Cache 460) that stores the current copy of the data in a manner which is beyond the scope of this invention. After any in-progress operations are completed on the requested cache line, it is returned to the MSU 110 on the associated one of Data Lines 510. Up to four return functions may be initiated from an MSU simultaneously. Furthermore, multiple return functions may be outstanding to the PODs at any given instant in time. The PODs need not respond to these return functions in the order in which the functions were issued.

When a POD 120 returns a cache line in response to a return function, it is stored within a Write Data Queues 830 within the POD Data Block 710 for that POD. Data Control 1040 generates control signals on Line 560 to cause the cache line to be transferred via the respective one of Lines 750 to the POD Data Block 710 associated with the requesting POD 120. In addition, the MCA 550 controls the transfer of the cache line from the POD Data Block 710 which is associated with the previous owner to the appropriate MSU Data Block 720 associated with the cache line address, and finally to the addressed MCL 535 so that the MSU has the latest copy of the data. The Memory Cluster Control Block 1020 associated with the addressed MCL 535 generates updated directory state information which reflects the new access status of the data. This updated directory state information is written back to the Directory Storage Array 630 in the addressed MCL over Lines 570 as controlled by signals on Control Line 560.

In another instance, a POD may initiate a Fetch operation for a cache line that the MSU does not own, but that is resident in a shared access state in one or more other caches. In this case, the MSU has the most recent copy of the data since data held under shared access may not be modified. The MSU may therefore provide the data to the requesting POD in the manner discussed above. In addition, if the Fetch operation requested exclusive access status, a Purge function must be issued to the POD(s) having the shared local copies, thereby causing these POD(s) to invalidate their local copy.

In addition to controlling transfers of cache line data, the MCA 550 also controls the POD-to-POD transfers of message data. Within the MCA, message routing information is passed from the POD Address Control Block 1010 to the Message Control 1080 on the respective one of Lines 1090 (shown as Lines 1090A, 1090B, 1090C, and 1090D) where this routing information is stored in a FIFO queue structure (not shown). The routing information for the message at the front of the FIFO is made available to the Data Control 1040 on control lines shown collectively as Line 1095. When Data Control 1040 selects the message for transfer, Data Control generates control signals on Line 560 which are driven to the MDA 530. The control signals enable the transfer of message data from one of the Write Data Queues of a first (sending) POD Data Block 710 to input Data Select Logic (not shown) of another (receiving) POD Data Block on the appropriate interface represented by one of Lines 750. This message data is then routed to the associated POD 120 on Data Lines 510. The Data Control 1040 also generates control signals on Line 1060 to the POD Address Control Blocks 1010 associated with the POD receiving the message data. This causes one of the POD Address Control Blocks to send a response to the receiving POD indicating that message data is available. Message Control 1080 then generates control signals on line 1090 to the POD Address Control Blocks 1010 associated with the POD sending the message data. Up to four messages may be routed simultaneously within the MDA 530, and message routing may occur in parallel with receiving data from, and/or transferring data to, ones of the PODs, and receiving data from, and/or transferring data to, ones of the MCLs 535. This causes a respective one of the POD Address Control Blocks to send a response to the sending POD indicating that the message data has been transferred.

Figure 10:
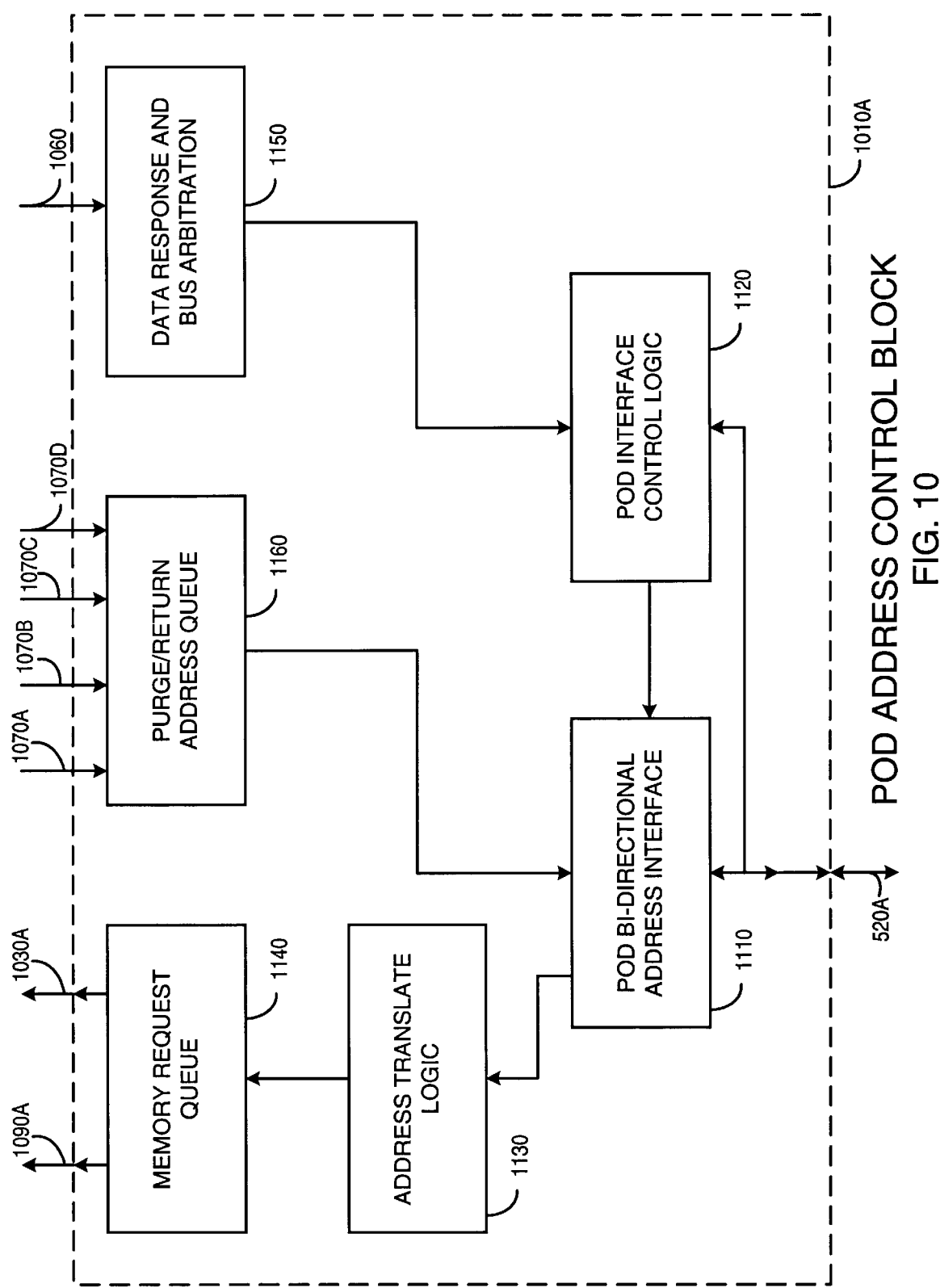
FIG. 10 is a block diagram of a POD Address Control Block in the representative SMP.

FIG. 10 is a block diagram of the POD Address Control Block 1010. Address Control Block 1010A is shown and described, but it is understood that this discussion applies equally to all POD Address Control Blocks 1010A, 1010B, 1010C, 1010D. The POD Bi-directional Address Interface 1110 interfaces with the POD 120A over bidirectional interface shown as Address/command Line 520A, which is used to send and receive addresses and related control information to/from POD 120A as described above.

POD Bi-directional Address Interface 1110 is controlled by a distributed state machine that is located in both the POD Interface Control Logic 1120 and in POD 120A. This distributed state machine determines the direction of the bi-directional interface shown on Address/command Line 520A. To obtain optimal system performance, the bidirectional interface on Address/command Line 520 favors the POD 120 to MSU direction. As a result, no wait time is required when the POD initiates an address transfer from the POD to the MSU 110 during a Fetch, Flush, I/O Overwrite or Message Operation.

When an address is received from POD 120A on Address/command Line 520A during one of these operations, the address is stored in staging registers in POD Bi-directional Address Interface 1110. The address is then provided to the Address Translate Logic 1130, which performs a translation function on the address based on a address translation pattern stored in a general register array. This translation function re-maps certain addresses provided by the POD 120A to different areas of real memory to allow for memory bank interleaving, expanded memory capacity, and memory sharing capabilities.

After translation, the address is stored in Memory Request Queue 1140 prior to being transferred to the associated one of the Memory Cluster Control Blocks 1020 on Line 1030A. Memory Request Queue 1140 can store up to 16 addresses. The Memory Request Queue 1140 selects the next address for transfer to a Memory Cluster Control Block 1020 based on the type of operation being performed, the order in which the address was placed in the queue, and on whether or not the Memory Cluster Control Block 1020 associated with the addressed one of the Memory Clusters 535 is available to receive another request address. For Fetch or Flush operations, the selected address is removed from the Memory Request Queue and routed to one of the Memory Cluster Control Blocks 1020 as determined by the address. For Message operations, the current request address is routed via Line 1090A to the Message Control 1080 to be queued as discussed above. An address can be delivered to a Memory Cluster Control Block 1020 every two clock cycles, or every 20 nanoseconds.

As discussed above, an address can also be provided to the POD Address Control Block 1010A from each of the Memory Cluster Control Blocks 1020A, 1020B, 1020C, and 1020D on Lines 1070A, 1070B, 1070C, and 1070D, respectively, during Return or Purge Operations. Return Operations are initiated when a POD requests access to a cache line that is indicated by the associated directory state information as already being exclusively owned by a cache entity within another POD. The address of the cache line is therefore provided to the POD currently owning the data so that the data can be returned to the MSU 110.

For example, assume one of PODs 120B, 120C, or 120D provides a Fetch address to the MCA which is ultimately transferred to the Memory Cluster Control Block 1020 associated with the addressed cache line. After the cache line is read from the addressed MCL 535, it is determined that POD 120A has exclusive ownership of the requested cache line. In response, one of the Memory Cluster Control Blocks 1020 provides the address over the associated one of Lines 1070 to Purge/Return Address Queue 1160. Purge/Return Address Queue 1160 selects one of queued addresses using a rotational priority selection scheme for presentation to the POD Bi-directional Address Interface 1110. Once the bi-directional Address/command Line 520A may be driven by POD Bi-directional Address Interface 1110, the distributed state machine within the POD Interface Control Logic 1120 and POD 120A controls the presentation of the Return address from POD Bi-directional Address Interface 1110 to POD 120A. The POD 120A then returns data in the manner discussed above.

The same mechanism discussed above is used in association with a Purge function. As discussed above, a Purge function is initiated when a POD requests exclusive ownership of a cache line that is held by one or more PODs as shared owners. In this situation, the most recent copy of the data is held by the MSU 110 because PODs having shared ownership rights are not allowed to modify the data. Therefore, the requesting POD can obtain the cache line(s) from the MSU, but the shared owners must be notified to invalidate their local copies. One of the Memory Cluster Control Blocks 1020 provides the cache line address and an associated Purge function to each of the POD Address Control Blocks 1010 associated with the current shared owner(s). The POD Address Control Block(s) presents the addresses to the POD(s) in the manner described above with respect to Return functions, except that the POD(s) do not return data, but instead designate the local copies of the cache line as invalid.

As can be seen from the foregoing description, various queuing architectures for buffering and distributing data requests are implemented in systems such as the described SMP. Each MSU within the Main Storage system 110 of the example SMP needs to provide a high level of parallel request execution in order to achieve high system performance. The MSU is the principle data path and data coherency controller for all processors in the system, for the particular address range it covers. The previous discussion revealed that requests for data are processed in multiple stages by the example MSU, and these stages represent a variety of request queuing structures that are utilized in order to complete the necessary processing at that point in the request processing sequence. A number of request queuing structures within the Memory Controller ASIC (MCA) of the example MSU need to accept independent request streams from other queues and efficiently manage and deliver those requests to their destination process, which may or may not be shared. An example is the Purge/Return Address Queue 1160 of FIG. 10. Another example is the Data Control module 1040 of the MCA 550. The Data Control module 1040 ultimately receives all requests from other MCA request queuing structures (e.g., Memory Request Queue 1140 within the POD Address Control Block 1010, Memory Cluster Control Block 1020, and Message Control 1080) that need to perform a transfer of data between a data source and a data destination in order to continue or complete the request processing sequence. These data transfers may be between POD blocks, or between MCLs and POD blocks. The Data Control 1040 receives various types of data transfer requests, such as POD to POD return data requests from the POD Address Control Block 1010, POD to POD message data requests from the Message Control 1080, fetch data requests from the Memory Cluster Control Block 1020 for transferring read data from an MCL to a POD, and store data requests from the Memory Cluster Control Block 1020 for transferring write data from a POD to an MCL. The Data Control 1040 output is organized into four Memory Cluster Control Block 1020 destinations and four POD Address Control Block 1010 destinations. The function of the Data Control 1040 is to accumulate, schedule, and complete the data transfer requests such that its data transfer destinations are kept as busy as possible, given the input request stream. The primary output of the Data Control 1040 includes the MCA to MDA Control Lines 560 of FIG. 4. Other outputs include signals to source and/or destination queuing structures to indicate availability of data or completion of data transfer. Data Control 1040 needs to coordinate multiple requests that have a common data source so that only one destination is allowed access to the data source at any time, to prevent unpredictable data transfer results. This is because the data sources are single port read structures, and can only access one data location at a time.

The architectures for the request queuing structures of Data Control 1040 and the Purge/Return Address Queue 1140 therefore must provide for efficient and fair handling of requests, in order to make the best use of the available request bandpass, minimize request stalling, and eliminate the chance of request lockout. The present invention provides a solution to this problem.

The present invention provides a least-recently-serviced rotational priority method and structure that addressed the aforementioned issues using certain design rules. One such design rule is that the priority assignment of a requester that was most recently granted priority will be moved to the bottom of the priority schedule. Another design rule is that the lower priority requesters (i.e., those assigned from the bottom of the priority schedule up through the requester just below the requester receiving the grant) will all move up one priority level, while the higher priority requesters (i.e., those assigned from the top of the priority schedule down through the requester just above the requester receiving the grant) will maintain their current priority level.

The resulting effect is that a requester maintains, or tends to gain, priority ranking while it is inactive, depending on the activity of the other requesters. No priority ranking is ever lost. Request stallouts are minimized because the requesters seeking service often end up assigned to the lower priority levels, and a requester requesting service less often will tend to be favored when it does make a service request. The invention also tracks the trend of request activity, so there is no "fixed" priority scheme per se. During times when a first set of requesters (e.g., A, B, C) are very busy, less active requesters (e.g., D, E, F) tend to rise in priority assignment level, and vice versa when requesters D, E, F are very busy compared to requesters A, B, C. This regulated priority scheme tends to equalize the service times across all requesters for all request mixes.

Figure 11:
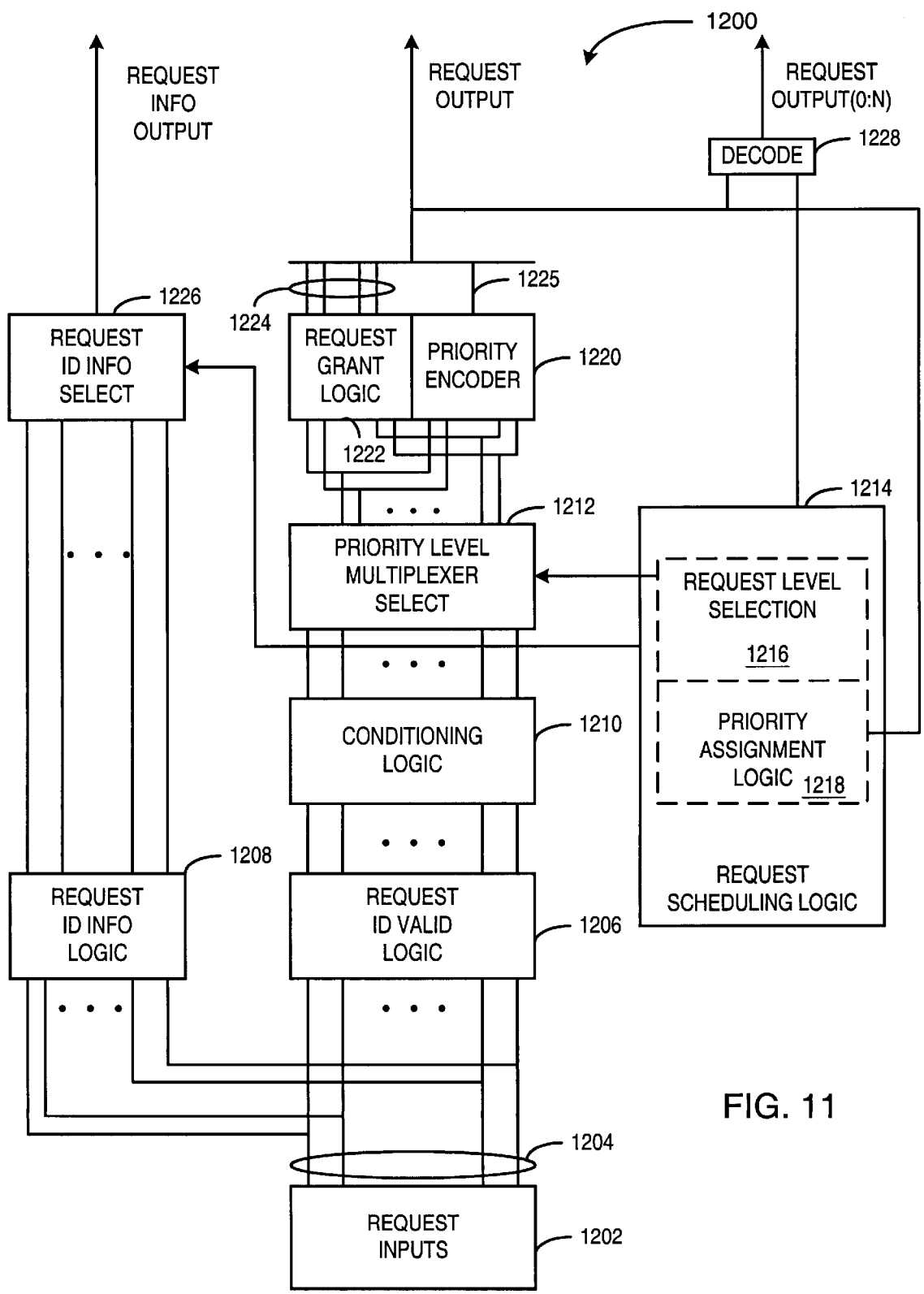
FIG. 11 is a block diagram of one embodiment of a Least-Recently-Serviced Rotational Priority (LRSRP) apparatus in accordance with the present invention.

FIG. 11 is a block diagram of one embodiment of a Least-Recently-Serviced Rotational Priority (LRSRP) apparatus 1200 in accordance with the present invention. In one embodiment of the invention, the priority structures are contained within the MSUs 110, and more particularly within the MCA 550. The example LRSRP can be used with queue structures having various queue depths, resulting in an LRSRP having 4 inputs, 8 inputs, 16 inputs, or any other desired number.

The LRSRP structure is capable of multiple mode operation. For example, in one embodiment of the invention, there are two modes of operation used. The first mode (Mode 1) is used when the LRSRP structure receives Request IDs from multiple source requesters, and uses priority selection to select a Request ID for a single destination. In this mode, once a request is registered (i.e., becomes "active"), the maximum delay until its transfer authorization grant is approximately equal to the number of requesters in the system times the average time between subsequent grants of transfer authorization. A second mode (Mode 2) is used when the LRSRP structure is to receive all Request IDs from a common source, where each Request ID is targeted for a unique destination. Mode 2 is useful when destination load balancing is desired. For example, "destination busy" conditions can be fed back to an LRSRP operating in Mode 2, thereby allowing lower priority Request IDs through to non-busy destinations. This makes most efficient use of the available requester bandpass.

Requests that are input into the LRSRP 1200 are referred to as Request IDs, where Request ID (0) refers to a request from a requester connected to input (0), Request ID (1) refers to a request from a requester connected to input (1), and so on through input (N−1) (e.g., N=2–16, or any desired, meaningful value). These requests are designated as request inputs 1202, and are depicted on request lines 1204. The request protocol employed in one embodiment of the invention is a one-clock-cycle-wide Request ID valid pulse, accompanied by associated request information such as source data queue location.

The input Request ID valid signals are immediately presented to the Request ID Valid Logic 1206 for priority consideration, where the clock-cycle-wide request valid pulse is recognized. The Logic 1206 also provides registers to continuously provide the asserted logic state of the request valid signal to the next level of priority logic until priority is granted. As will be described in greater detail in connection with FIG. 13, the request ID valid logic also sends a busy signal back to the requester to indicate that the request is still pending, which in turn prevents the requester from issuing another request. The input Request ID information is also presented immediately to its associated next level of priority logic shown as the Request ID Information Logic 1208, and registered to hold the information until priority is granted.

The next level of priority logic for the Request ID valid signals is a conditioning level, depicted by the Conditioning Logic 1210. If the destination for this LRSRP is busy due to a previously-issued, pending request from this LRSRP structure, or due to another external condition that forces a busy condition, then the Request ID valid signal(s) is blocked at the Conditioning Logic 1210. Examples of external conditions that can force a busy condition include: (1) downstream queue structures are full such that no more requests can be released from this LRSRP; and (2) LRSRP issued a request to a destination, but the destination requires multiple clock cycles to process the request before accepting another. Specific busy conditions are application and mode dependent. For example, if the LRSRP is operating in Mode 2, and Request ID(i) has the highest priority assignment but its targeted destination is busy, and the destination for Request ID(i+1) is free, then Request ID(i) is removed from priority consideration and Request ID(i+1) is considered highest priority.

The conditioned Request ID valid signals are next presented to a network of priority level multiplexers, depicted as the Priority Level Multiplexer Select 1212. There is one priority level multiplexer for each potential Request ID, and each conditioned Request ID valid signal from the Conditioning Logic 1210 feeds each of priority level multiplexer contained within the Priority Level Multiplexer Select 1212. As will be described in greater detail below, the multiplexers are arranged so that level (0) represents the highest priority down to level (N−1) having the lowest priority. Each multiplexer within the Priority Level Multiplexer Select 1212 is controlled by a corresponding request level register associated with the Request Scheduling Logic 1214. The Request Scheduling Logic 1214 includes the Request Level Selection 1216 and Priority Assignment Logic 1218 which integrally cooperate to provide selection signals to the Priority Level Multiplexer Select 1212 and to accommodate reassigning priority values, as will be described in greater detail in connection with FIG. 13.

A priority level multiplexer will select only one out of the N conditioned Request ID valid signals. In one embodiment of the invention, the registers within the Request Scheduling Logic 1214 are initially loaded with predetermined values at system initialization time to be preset to a first priority schedule. This first priority schedule will change after processing of the first Request IDs, which is described more fully below. The initial loading of registers within the Request Scheduling Logic 1214 can be accomplished via scan-set methods which are known in the art. Other known methods of initially loading the first priority schedule into the Priority Level Multiplexer Select 1212 can also be used without departing from the scope and spirit of the invention. This will become more apparent from the description of a more particular embodiment illustrated in FIG. 13.

The Priority Level Multiplexer Select 1212 feed a Priority Encoder 1220 that outputs the address of the highest priority level multiplexer which is asserting a selected, conditioned Request ID. The Priority Encoder 1220 output is essentially an address that points to the corresponding request level register. This "address" on line 1225 points to the corresponding Request Level Register, which in turn contains the ID number of the Request ID for which priority was granted. The value of the addressed request level register is used to select associated information for that Request ID, via the Request ID Information Select 1226 circuit. A Mode 1 LRSRP then outputs the grant signal where it will in turn be used as a Request ID valid signal at its destination. A mode 2 LRSRP uses the grant signal to enable a Decode 1228 of the selected ID number, and the output of the Decoder 1228 forms the Request ID valid input at the targeted destination. In both cases, the information associated with the request is also output from the Request ID Information Select 1226 circuit. The output request and associated information is transmitted to the destination for further processing.

It is in this manner that particular requests are granted authority to be output to their respective destinations, based on relative priorities. However, the relative priorities must also be changed in order to realize one object of the invention, which is to ensure fair prioritization and distribution of all requests. In other words, if the priorities assigned to the Priority Level Multiplexer Select 1212 did not change, a particular requester being assigned to the highest priority level could theoretically monopolize the system such that it was always granted permission to pass along its request, to the exclusion of the other requesters in the system. The Request Scheduling Logic 1214 provides this function.

Thus, a grant of priority in the present invention initiates priority reassignment via modification of the relative priorities of the requests. In one embodiment of the invention, the values in the request level registers of the Request Scheduling Logic 1214 are adjusted to accomplish this. While a particular example will be described in connection with FIG. 13, it will be generally described here. The value contained in a particular request level register associated with a granted request having the highest priority (level X) will be modified such that it is subsequently associated with the lowest priority request level register (e.g., N−1 where request level register 0 is associated with the highest priority level, and there are N possible request inputs). Request level register (X) through (N−2) are then enabled to receive values from their respective preceding register levels (e.g., level X+1 is provided to level X, and level N−2 is provided to level N−1, and so forth). Request level registers above the granted level (X) will be instructed to hold their current register priority values. In other words, the granted Request ID will move to the lowest priority assignment, others at the lowest priority assignment up to just below the granted level will advance in priority assignment by one while maintaining their relative priority assignment to each other, and the remainder (if any) will retain their current priority assignments. This is conceptually illustrated in FIG. 12.

Figure 12:
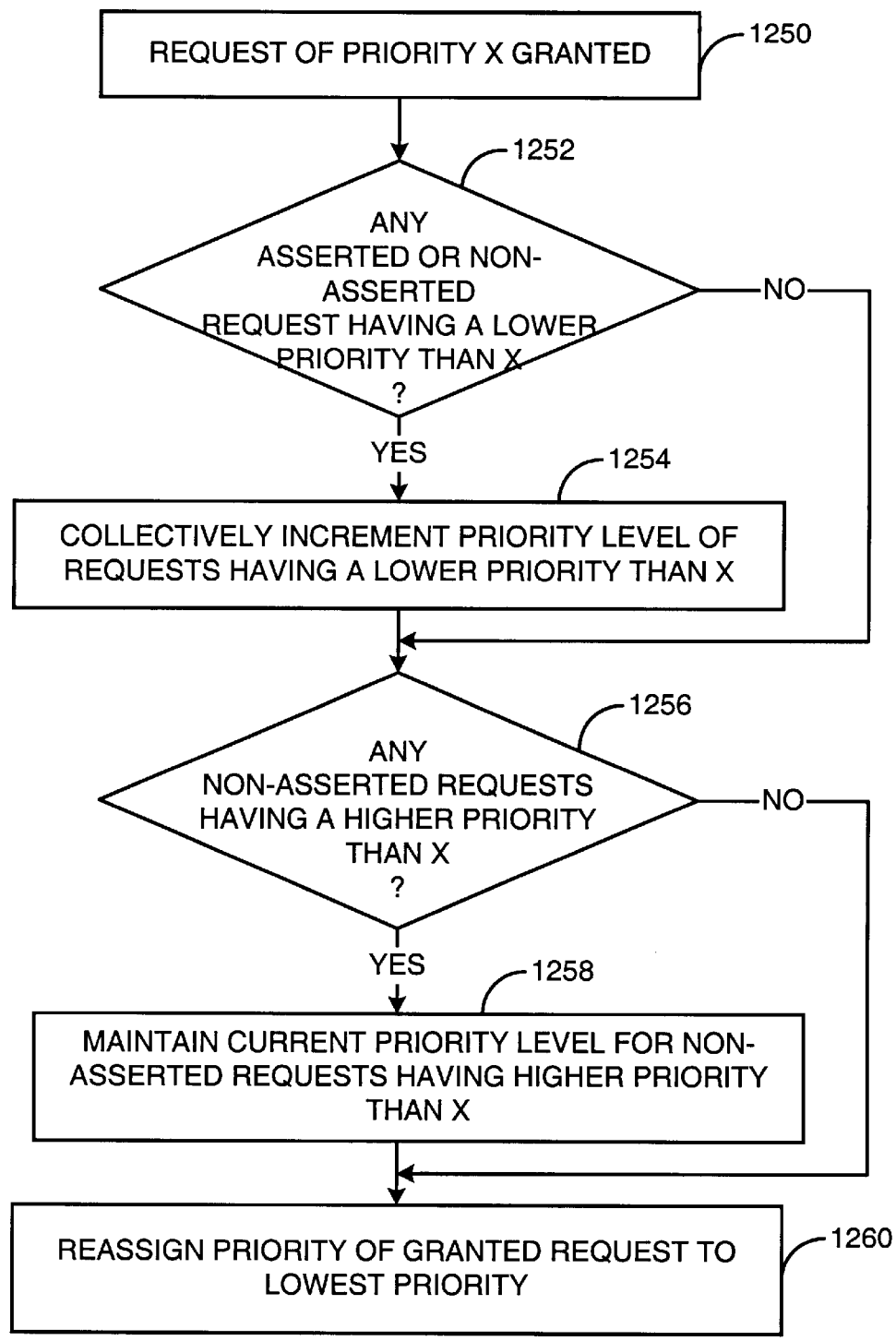
FIG. 12 is a flow diagram illustrating one embodiment of a process carried out in accordance with the priority principles of the present invention.

Referring now to FIG. 12, a flow diagram is provided illustrating one embodiment of a process carried out in accordance with the priority principles of the present invention. In FIG. 12, it is assumed that $0 \leq X \leq N$, where X=the relative priority level of a granted request, and N=the total number of Request ID inputs. In other words, where there are N Request ID inputs, and each of the N Request IDs has an associated priority in the LRSRP 1200, the Request ID receiving the grant is assumed to have a priority level of X.

Generally, in accordance with one embodiment of the invention, a request is granted having a priority X, as seen at block 1250. It is determined 1252 whether any Request IDs have a lower priority than priority X, regardless of whether these Request IDs are currently associated with an active request or not (i.e., whether or not a Request ID signal was received at the Request ID input). If so, the priority level associated with these request IDs are collectively incremented 1254, while maintaining the same priority relationship relative to each other. If it is determined 1256 that there are any Request IDs having a higher priority than X, the priority level associated with these Request IDs is maintained 1258 at their current values. This only applies to non-asserted Request IDs in this instance (or asserted but blocked by the Conditioning Logic 1210), since if requests having a higher priority than X were active/asserted, then that request would have been the priority X request. Regardless of whether other Request IDs are priority-modified, the priority of the granted request is reassigned 1260 to the lowest priority. The preceding description reveals that a given Request ID will never lose priority ranking during times that it is idle, and as it remains least-recently-serviced, it will gradually advance to the top priority level.

Figure 13:
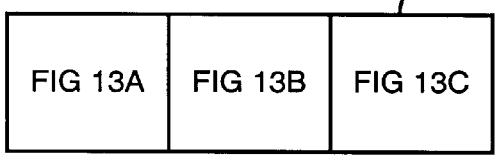
FIG. 13, including
Figure 13A:
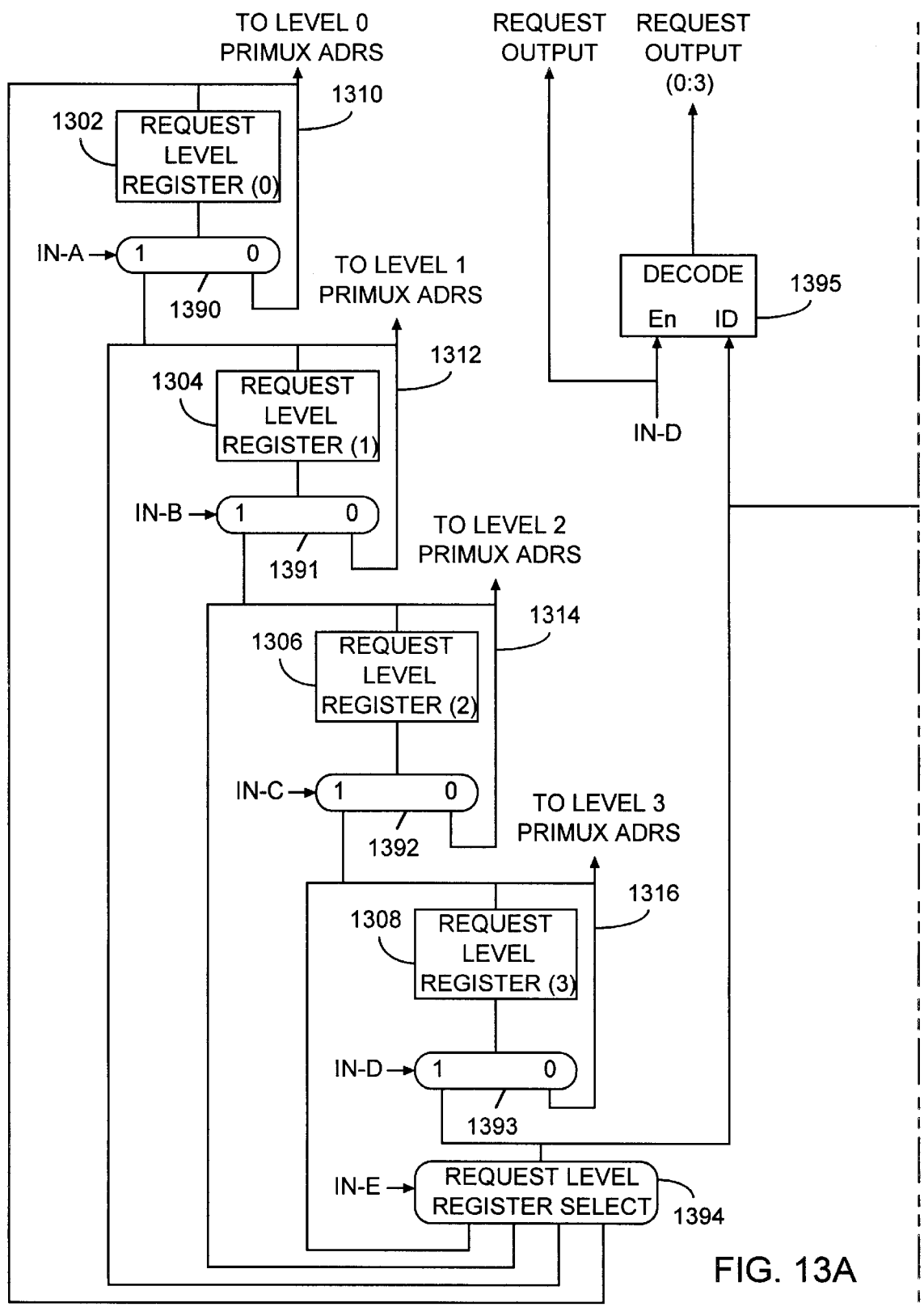
FIGS. 13A, 13B and 13C, is a block diagram of a more specific embodiment of a Least-Recently-Serviced Rotational Priority structure in accordance with the present invention.
Figure 13B:
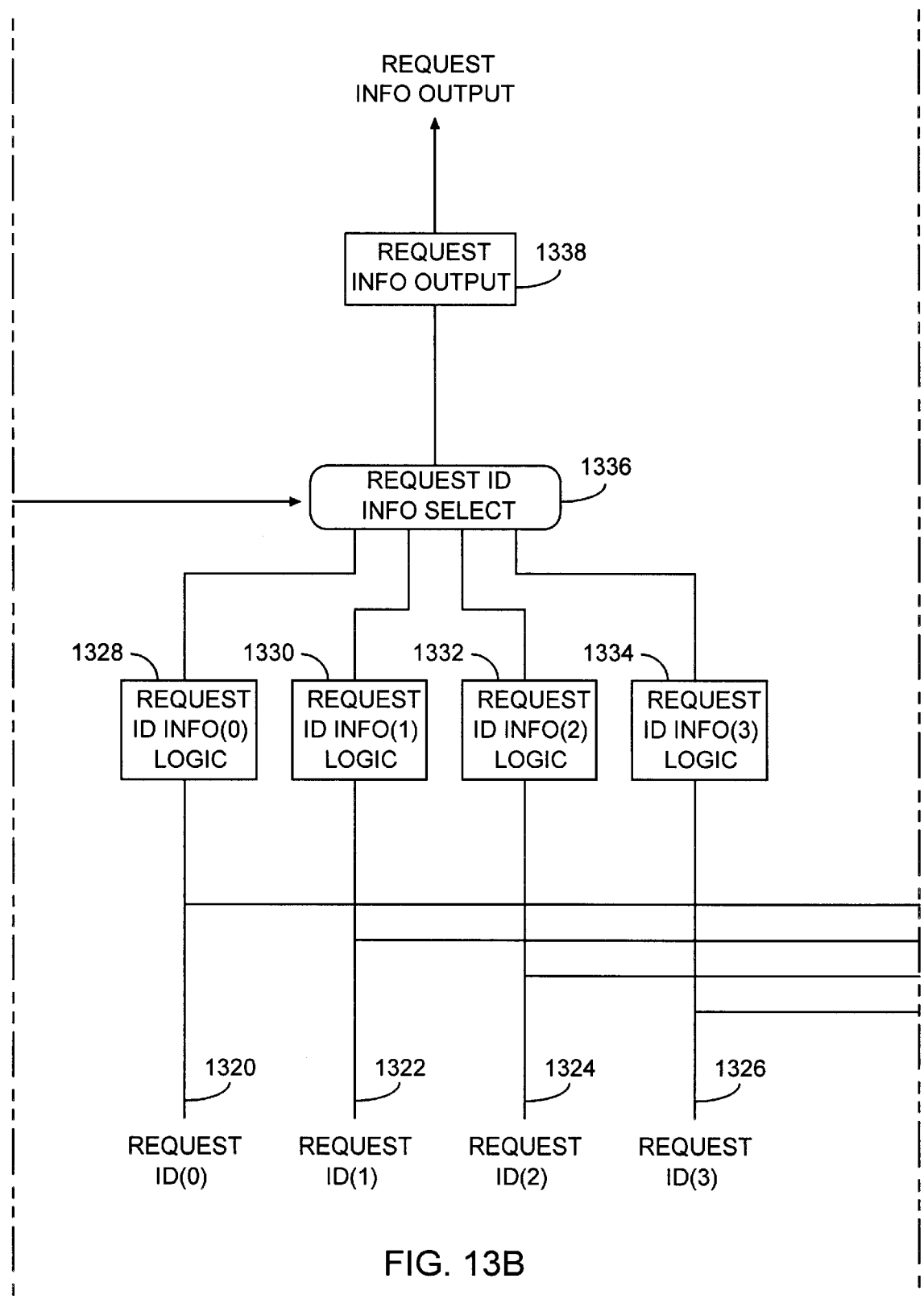
Figure 13C:
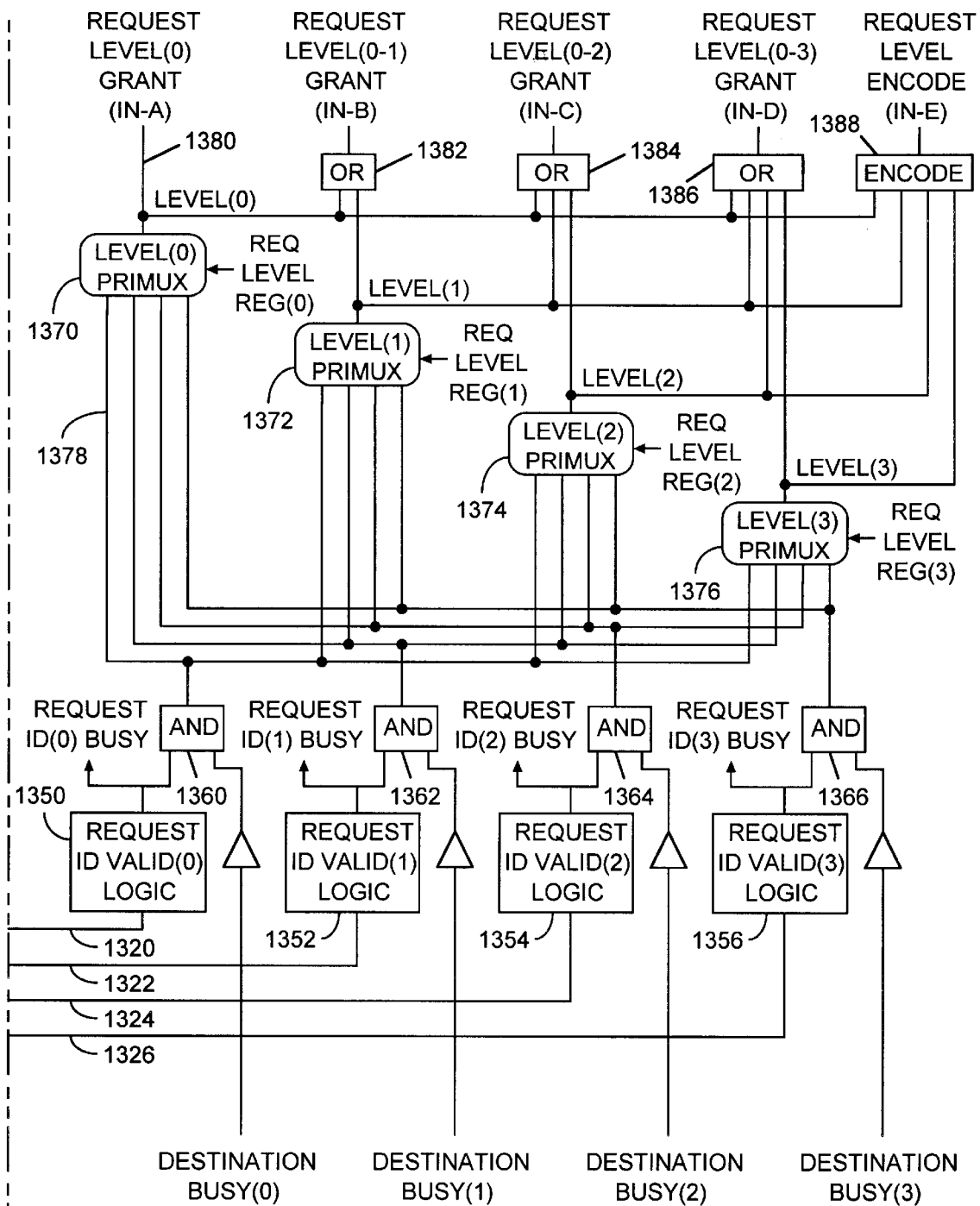

FIG. 13, including FIGS. 13A, 13B and 13C arranged as shown, is a block diagram of a more specific embodiment of a Least-Recently-Serviced Rotational Priority structure 1300 in accordance with the present invention. The embodiment of FIG. 13 is a 4 input to 1 output structure (i.e., 4 Request ID inputs). Other input-to-output ratios can also be implemented as would be apparent to those skilled in the art from an understanding of the description provided herein.

FIG. 13A represents one embodiment of the Request Scheduling Logic 1214 described in connection with FIG. 11. The request level registers described are depicted as Request Level Register(0) 1302, Request Level Register(1) 1304, Request Level Register(2) 1306, and Request Level Register(3) 1308.

The Request Level Registers are preset at the time of system initialization to a first priority schedule. The values in the Request Level Registers are used to control multiplexers in the Priority Level Multiplexer Select 1212, and therefore at least in part act as multiplexer control signals. For a four-input system, each of the multiplexers in the Priority Level Multiplexer Select 1212 have four inputs, therefore requiring 2 control signals to allow selection of one of four inputs. Therefore, each of the Request Level Registers 1302, 1304, 1306, 1308 is preset with a 2-bit value corresponding to a priority multiplexer control signal. These control signals are provided to the Priority Level Multiplexer Select 1212 via control lines 1310, 1312, 1314 and 1316 respectively, as will be described more fully below.

Once the system has been initialized and is operating normally, requesters will begin to send transfer requests to the Least-Recently-Serviced Rotational Priority structure 1300. These requests are input to request input lines labeled in FIG. 13B as Request ID(0) 1320, Request ID(1) 1322, Request ID(2) 1324, and Request ID(3) 1326. The request protocol can take a variety of forms, but in one embodiment of the invention is a one-clock-cycle-wide pulse, herein refered to as a Request ID valid pulse, which is accompanied by associated request information such as source data queue location. The associated information is input into the Request ID Information Logic modules 1328, 1330, 1332 and 1334 to hold this information until priority is granted. When priority for a particular Request ID is granted, the corresponding information will be selected for output by the Request ID Information Select circuit 1336, which in one embodiment of the invention includes a multiplexing unit whose output is controlled by an input control signal. The information is optionally registered in the Request Information Output block 1338, and transferred to the appropriate destination. Control for the Request ID Information Select circuit 1336 is provided by the Request Scheduling Logic 1214 shown in FIG. 11, in which a more specific embodiment is illustrated in FIG. 13A and described more fully below.

Referring now to FIG. 13C, the request input lines Request ID(0) 1320, Request ID(1) 1322, Request ID(2) 1324, and Request ID(3) 1326 are also provided to the Request ID Valid Logic modules, labeled Request ID Valid (0) Logic 1350, Request ID Valid(1) Logic 1352, Request ID Valid(2) Logic 1354, and Request ID Valid(3) Logic 1356 respectively. Each of the Request ID Valid Logic modules includes circuitry to pass the input Request ID immediately to the output of the Request ID Valid Logic 1350, 1352, 1354, 1356 for immediate priority consideration. Each of the Request ID Valid Logic modules also includes circuitry to hold the Request ID and maintain an asserted request signal until priority is granted for that signal. A busy signal is also provided, which is sent back to the requester to indicate that the request is still pending. This prevents those requesters from issuing another request before the current request is processed. These "busy signals" are provided by each of the Request ID Valid Logic modules, wherein the Request ID(0) Busy signal is provided by the Request ID Valid(0) Logic module 1350, the Request ID(1) Busy signal is provided by the Request ID Valid(1) Logic module 1352, the Request ID(2) Busy signal is provided by the Request ID Valid(2) Logic module 1354, and the Request ID(3) Busy signal is provided by the Request ID Valid(3) Logic module 1356.

It is also important to know whether a destination is currently unavailable to receive another transfer request. In these instances, requests targeted for those destinations are delayed until the destination becomes available, which helps to increase available request bandpass. This function is performed by the Conditioning Logic, shown in the embodiment of FIG. 13C as Boolean AND functions, labeled AND 1360, AND 1362, AND 1364 and AND 1366.

The conditioned Request ID Valid signals are next presented to a network of priority level multiplexers, depicted in FIG. 13C as Level(0) PriMux 1370, Level(1) PriMux 1372, Level(2) PriMux 1374, and Level (3) PriMux 1376. Each priority level multiplexer is coupled to receive each of the conditioned Request ID Valid signals. For example, Level(0) PriMux 1370 has four inputs, each to receive Request ID signals originally received on lines 1320, 1322, 1324 and 1326. The same applies to the other priority level multiplexers. As will become more evident from the ensuing description, the multiplexers are arranged so that the Level (0) PriMux 1370 represents the highest priority, with decreasing priority down to the lowest priority—Level(3) PriMux 1376. It should be recognized that systems having a larger number of Request IDs will have a correspondingly larger number of priority level multiplexers, wherein each multiplexer will have a width large enough to accommodate the total number of Request IDs available.

Each of the priority level multiplexers (1370, 1372, 1374, 1376) is controlled by one or more control signals. In the embodiment of FIG. 13, the control signals are shown as Request Level Register(0), Request Level Register(1), Request Level Register(2), and Request Level Register(3). These signals are received from lines 1310, 1312, 1314 and 1316 respectively, as shown in FIG. 13A. In other words, it is the value within each of the Request Level Registers 1302, 1304, 1306, and 1308 that provides the control signals to the priority level multiplexers 1370, 1372, 1374 and 1376 respectively. Because an initial preset value is loaded into each of the Request Level Registers, each of the priority level multiplexers is initially set to allow passage of one of the four conditioned Request ID signals. If Request Level Register(0) is preset to binary value 00, one of the four inputs to the Level(0) PriMux 1370 will be selected for output, such as the signal on line 1378.

The Request Grant Logic includes the output of Level(0) PriMux depicted by line 1380, and the Boolean OR functions depicted by OR-gates 1382, 1384, and 1386. It is evident from this Request Grant Logic that an asserted Request ID signal available at the output of the Level(0) PriMux 1370 will activate the Request Level(0) Grant signal, as well as the Request Level(0–1) Grant signal, the Request Level(0–2) Grant signal, and the Request Level (0–3) Grant signal due to the OR-gates 1382, 1384 and 1386. As will become more apparent from the following description, activation of all of these grant signals allows each of the Request IDs having a lower priority than the Request ID at the Level(0) PriMux 1370 to increment in priority. Similarly, if the only asserted Request ID signal was provided at the output of the Level(2) PriMux 1374, only the Request Level(0–2) Grant signal and the Request Level (0–3) Grant signals are activated, due to the OR-gates 1384 and 1386. In this instance, each of the Request IDs having a lower priority than the Request ID at the Level(2) PriMux 1374 will be incremented in priority, while those Request IDs having a higher priority value will maintain their current priority.

The priority level multiplexers 1370, 1372, 1374, 1376 feed a priority encoder 1388 that produces the address of the highest priority, active Request ID valid signal selected by the priority level multiplexers. In other words, if the Level (1) PriMux 1372, the Level(2) PriMux 1374, and the Level (3) PriMux 1376 all have active Request ID valid signals at their outputs, but the Level(0) PriMux 1370 does not, the encoder 1388 would produce an address corresponding to the Level(1) PriMux 1372. This is because it is the highest priority of the 3 priority level multiplexers producing an active Request ID valid signal. The "address" provided by the encoder 1388 points to the corresponding Request Level Register of FIG. 13A, which in turn contains the ID number of the Request ID for which priority was granted.

The signals provided at the Request Grant Logic and the Priority Encoder are provided to the Request Scheduling Logic of FIG. 13A. More specifically, the Request Level(0) Grant signal (IN-A) of FIG. 13C is provided as the IN-A control signal to the multiplexer 1390 of FIG. 13A. Similarly, the Request Level(0–1) Grant signal (IN-B) of FIG. 13C is provided as the IN-B control signal to the multiplexer 1391 of FIG. 13A; the Request Level(0–2) Grant signal (IN-C) of FIG. 13C is provided as the IN-C control signal to the multiplexer 1392 of FIG. 13A, and the Request Level(0–3) Grant signal (IN-D) of FIG. 13C is provided as the IN-D control signal to the multiplexer 1393 of FIG. 13A. The Request Level Encode signal (IN-E) is provided as the IN-E control signal to the Request Level Register Select 1394 of FIG. 13A.

The address from the Encoder 1388 represents an address of the Request Level Register that is granted a transfer. The Request Level Register Select 1394 selects the appropriate input based on this address, and outputs the Request Level Register value to the Request ID Information Select 1336 of FIG. 13B. This allows the information corresponding to the granted Request ID to be selected for output along with a request output corresponding to the granted Request ID.

Further, depending on the state of the Request Level Grant signals in FIG. 13C (i.e., IN-A, IN-B, IN-C, IN-D), multiplexers 1390, 1391, 1392 and 1393 of FIG. 13A will select one of two inputs. A first input is provided by the immediately preceding Request Level Register, and the other input is provided by its own output. For example, upon the occurrence of a transfer grant, Request Level Register(2) 1306 will either receive the value stored in the Request Level Register(3) 1308 or retain its current value, depending on the state of the IN-C control input to multiplexer 1392. The state of the IN-C control input was determined by the state of the output of the OR-gate 1384 of FIG. 13C, the operation of which was previously described. Therefore, it can be seen that depending on the state of the grant signals (line 1380, and the output of OR-gates 1382, 1384, 1386), each of the Request Level Registers 1302, 1304, 1306 and 1308 will either be incremented in priority, or will remain at the same priority level, which is one of the objects of the present invention.

Again, the example of FIG. 13 illustrates how a given Request ID retains its priority ranking during times that it is idle, and will gradually advance to the top priority level if it remains the least-recently-serviced. Also, the LRSRP structure can be resized by increasing the number of levels and Request ID input width. A given Request ID may be intentionally provided higher priority by loading its ID value into multiple request level registers, or given no chance of priority by removing its ID value from the request level register set. If the LRSRP structure is designed to have more levels than the Request ID width, then such priority enhancement can be applied to desired Request IDs during normal operating conditions, as some request level registers will be unused. If the Request ID input width and number of levels in the LRSRP structure are equal, then these adjustability features are most useful as stress-testing or debug aids, since Request IDs would have to be turned off to give others more priority chances.

It should also be recognized that the particular mode of operation can be accommodated by the example embodiment of FIG. 13. For example, a Mode 2 LRSRP structure uses the grant signal to enable a decoder 1395 to decode the selected ID number to provide an individual Request Output to a targeted destination. As previously described, Mode 2 is used when the LRSRP is to receive all Request IDs from a common source and distribute the requests to various destinations. This differs from a Mode 1 application where a single request output signal is sufficient, since requests from multiple request sources are targeted for a common destination.

Figure 14:
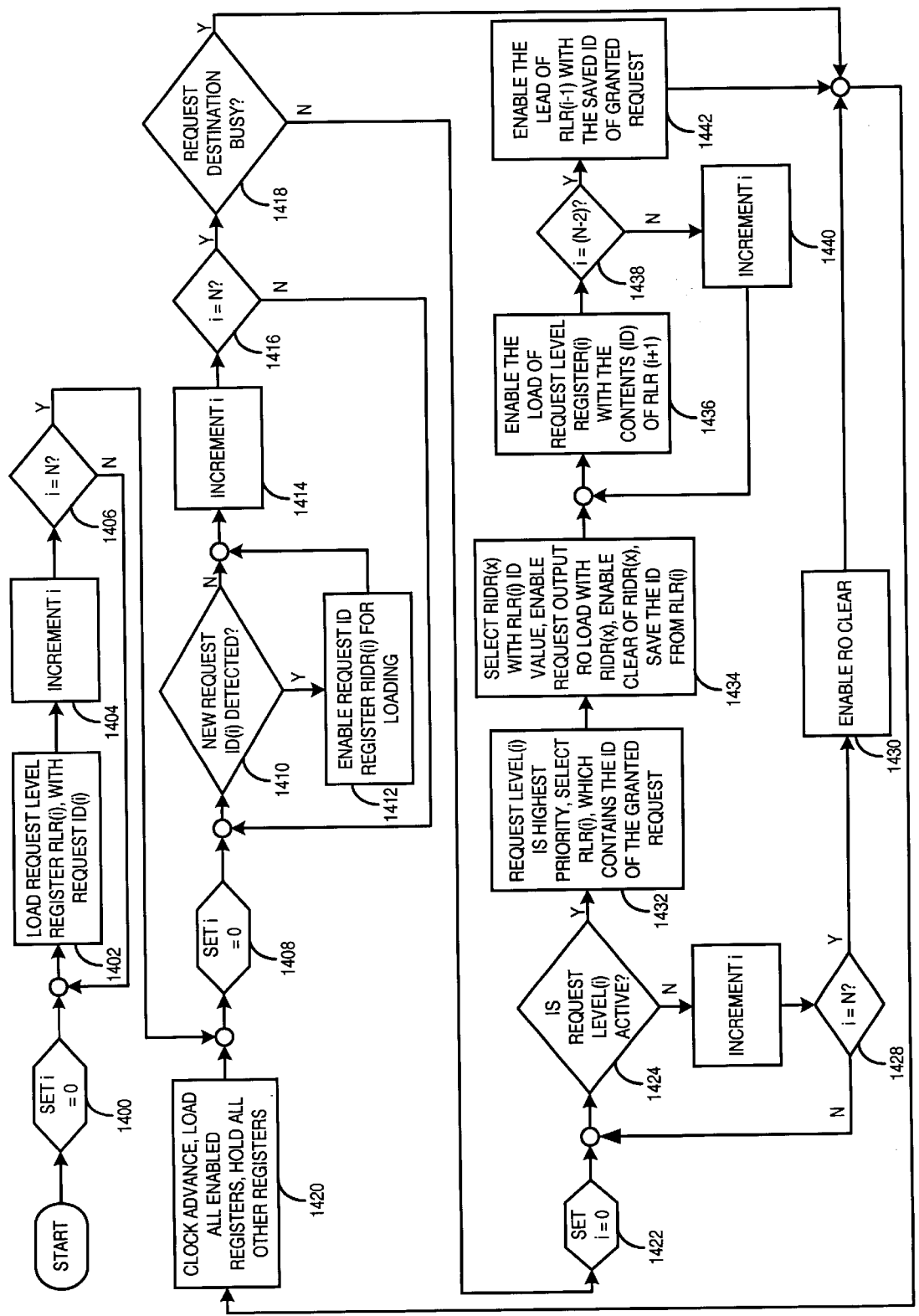
FIG. 14 is a flow diagram of one embodiment of a process implemented by the LRSRP structure of the present invention.

FIG. 14 is a flow diagram of one embodiment of a process implemented by the LRSRP structure of the present invention. The LRSRP in this example is operating in Mode 1. The flow diagram is independent of any specific number of Request ID inputs at a particular LRSRP. This embodiment conceptually illustrates the LRSRP algorithm, without regard to the specific hardware used to implement it. For example, the variable i is used in the flow diagram to designate one of N instances and is incremented in the diagram to account for all instances, however in the previously described embodiment there is no such implemented variable or incrementer. Likewise, each flow diagram loop execution does not indicate a sequence step in the aforementioned implementation. The LRSRPs used in the previous example perform all loops concurrently, and all instances are evaluated in parallel. An advance of the example hardware's clock updates the results into LRSRP registers. Therefore, the following description provides a conceptual understanding of a method in accordance with the present invention.

Referring now to FIG. 14, processing at Blocks 1400, 1402, 1404, and 1406 represent the initialization of all Request Level Registers (RLRs) in the LRSRP structure. A variable, such as i, is set 1400 to a predetermined value (e.g. zero) to operate as a count variable. As seen at block 1402, the Request Level Registers (RLR) are initially loaded with Request ID values, such that RLR(i) is loaded with Request ID(i). The variable i is incremented 1404 to load the remaining RLRs, until i=N as determined at block 1406. If i is not equal to N, more RLRs are loaded 1402 until i=N, and all of the RLRs are initialized. This conceptually illustrates that all of the Request Level Registers are loaded prior to entering the main processing loop described below.

Flow diagram blocks 1408 through 1442 represent the main processing loop that continues as long as the system's functional clocks are operating. The loop is organized into 5 subflows. Subflow 1 describes the reception of Request IDs from source requesters and is represented by blocks 1408, 1410, 1412, 1414, and 1416. Subflow 2 is a decision point that determines if algorithm priority processing continues or exits to allow the system clock advance to update LRSRP registers, and is represented by block 1418. Subflow 3 describes the request priority selection, where the highest priority active Request ID is selected, the Request Output to the destination is enabled for loading, and the Request ID input register corresponding to the priority-granted request is enabled for clearing. Subflow 3 is represented by blocks 1422, 1424, 1426, 1428, 1430, 1432, and 1434. Subflow 4 describes the priority reassignment setup that is performed after a request has been granted priority, and is represented by blocks 1436, 1438, 1440 and 1442. Finally, Subflow 5, represented by block 1420, illustrates the advance of the example system clock that causes the enabled loading and clearing conditions to occur in the LRSRP register set.

Beginning with the main processing loop and Subflow 1, again variable i is set 1408 to zero, and if a new Request ID(i) is detected (found to be asserted) at block 1410, the Request ID Register, RIDR(i) is enabled for loading 1412 into the appropriate Request ID Valid and Request ID Information Logic. The variable i for the Request ID(i) is incremented 1414 and compared 1416 to the total number N of Request IDs until all of the Request IDs have been handled. If the destination is busy as determined at Subflow 2, block 1418, processing moves to block 1420 for a clock advance. The clock advance will cause all load enabled registers to be loaded, and all other registers will hold current values.

If the destination is not busy, algorithm processing continues to the request priority Subflow 3. Variable i is again set to zero, and it is determined 1424 whether the Request Level(i) is active. If not, i is incremented 1426 and checked against the total number N Request Levels, as seen at block 1428. Where i does not equal N, it is again determined 1424 whether another Request Level is active. If all Request Levels are evaluated and none is active (i.e., i=N), processing continues from block 1428 to block 1430 where the Request Output register is enabled for clear 1430. From 1430 processing continues back to block 1420 for clock advance and main loop reentry.

Where it is determined that a Request Level(i) is active at block 1424, processing continues to block 1432. Because in this embodiment of the invention, the Request Level priority decreases as i increases from 0 to N, the first active Request Level(i) discovered in the loop is the highest priority Request Level. The Request Level Register(i) is selected 1432, which contains the ID of the granted request. The Request ID Register corresponding to the selected Request Level Register(i) is selected at block 1434, where the Request Output is enabled for load with the information in the Request ID Register and the selected Request ID Register is subsequently enabled for clear. The ID from the Request Level Register(i) is saved to be used in the priority reassignment Subflow 4.

If a Request was granted priority, Subflow 4 is entered in order to set up the priority reassignment for the LRSRP. Blocks 1436, 1438, and 1440 are reiterated in order to enable the advance of priority assignments of Request IDs below the current granted Request ID. Finally, block 1442 enables the current granted Request ID to move to the lowest priority level. Request IDs above the current granted Request ID are left as is, i.e., their priority assignments are left unchanged. Subflow 4 is then exited and the system clock advance 1420 occurs in order to perform all register loads and clears that were set up.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. A method for prioritizing the delivery of information transfer requests in a system having one or more requesters to supply the information transfer requests, wherein active ones of the requesters have currently pending information transfer requests and non-active ones of the requesters have no currently pending information transfer requests, the method comprising:

granting transfer authorization to the information transfer request associated with an active requester that is currently assigned to the highest priority level in a range of priority levels;

incrementing the priority levels assigned to each of the active and non-active requesters having a priority level less than the priority level of the active requester that was granted the transfer;

maintaining a current priority level for each of the non-active requesters having a priority level greater than the priority level of the active requester that was granted the transfer; and reassigning the priority level of the active requester that was granted the transfer to the lowest priority level in the range of priority levels.

2. The method of claim 1, wherein granting transfer authorization comprises concurrently outputting a request grant enable signal and information corresponding to the granted information transfer request.

3. The method of claim 2, further comprising selecting the information corresponding to the granted information transfer request from a plurality of registers each storing information from their corresponding one of the information transfer requests.

4. The method of claim 3, wherein selecting the information comprises receiving a control signal indicative of which of the plurality of registers is storing the information corresponding to the granted information transfer request, and enabling output of the information corresponding to the granted information transfer request in response to the control signal.

5. The method of claim 1, wherein the number of the priority levels in the range of priority levels is equal to the number of requesters in the system.

6. The method of claim 1, wherein the one or more requesters target the information transfer requests to a single destination.

7. The method of claim 6, wherein incrementing the priority levels comprises incrementing the priority levels a maximum number of times equal to a total number N of the requesters in the system, whereby an active one of the requesters is guaranteed a maximum delay from its activation to its grant of transfer authorization that is substantially equal to $N \times t_G$, where $t_G$ is an average time between subsequent grants of transfer authorization.

8. The method of claim 1, wherein the system comprises one requester to supply the information transfer requests, and wherein the one requester supplies a plurality of the information transfer requests to a plurality of destinations.

9. The method of claim 1, further comprising transmitting a Request Busy signal to each of the active requesters to prohibit additional information transfer requests from the active ones of the requesters until each respective one of the active requesters has received its grant of transfer authorization.

10. The method of claim 1, further comprising prohibiting incrementing of the priority level assigned to an active one of the requesters if the requester's destination is unavailable to receive the information transfer request.

11. The method of claim 1, wherein the number of the priority levels in the range of priority levels is greater than the number of requesters in the system, and wherein the method further comprises increasing a particular requester's likelihood of obtaining the grant of transfer authorization relative to other ones of the requesters by assigning multiple ones of the priority levels to the particular requester.

12. The method of claim 1, further comprising initializing each of the requesters to have a corresponding one of the priority levels in the range of priority levels.

13. A data transfer request prioritization circuit for use in a data processing system having a plurality of requesters that initiate data transfer requests, wherein active ones of the requesters have currently pending data transfer requests and non-active requesters have no currently pending data transfer requests, the prioritization circuit comprising:

means for granting transfer authorization to the data transfer request associated with an active requester that is currently assigned to the highest priority level in a range of priority levels;

means for incrementing the priority levels assigned to each of the active and non-active requesters having a priority level less than the priority level of the active requester that was granted the transfer;

means for maintaining a current priority level for each of the non-active requesters having a priority level greater than the priority level of the active requester that was granted the transfer; and means for reassigning the priority level of the active requester that was granted the transfer to the lowest priority level in the range of priority levels.

14. The data transfer request prioritization circuit as in claim 13, further comprising a data request information storage device to store the information associated with each of the pending data transfer requests.

15. The data transfer request prioritization circuit as in claim 14, wherein the means for granting transfer authorization comprises means for concurrently outputting a request grant enable signal and the information associated with the data transfer request granted transfer authorization.

16. The data transfer request prioritization circuit as in claim 13, wherein the means for incrementing the priority levels comprises means for incrementing the priority levels a maximum number of times equal to a total number N of the requesters in the system.

* * * * *